US011115995B2

(12) United States Patent
Bergström et al.

(10) Patent No.: US 11,115,995 B2
(45) Date of Patent: Sep. 7, 2021

(54) SCHEDULING TIMER

(71) Applicant: TELEFONAKTIEBOLAGET L M ERICSSON (PUBL), Stockholm (SE)

(72) Inventors: Mattias Bergström, Sollentuna (SE); Mats Folke, Vällingby (SE); Magnus Stattin, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 58 days.

(21) Appl. No.: 16/327,768

(22) PCT Filed: Aug. 17, 2017

(86) PCT No.: PCT/IB2017/054998
§ 371 (c)(1),
(2) Date: Feb. 22, 2019

(87) PCT Pub. No.: WO2018/037317
PCT Pub. Date: Mar. 1, 2018

(65) Prior Publication Data
US 2019/0208535 A1    Jul. 4, 2019

Related U.S. Application Data

(60) Provisional application No. 62/378,373, filed on Aug. 23, 2016.

(51) Int. Cl.
*H04W 72/12* (2009.01)
*H04L 1/18* (2006.01)
(Continued)

(52) U.S. Cl.
CPC ....... *H04W 72/1263* (2013.01); *H04L 1/1883* (2013.01); *H04W 4/80* (2018.02);
(Continued)

(58) Field of Classification Search
CPC ... H04W 72/1263; H04W 72/12; H04W 4/80; H04W 72/0446; H04W 72/14; H04W 76/28; H04W 72/1278; H04L 1/1883
See application file for complete search history.

(56) References Cited

U.S. PATENT DOCUMENTS

2010/0322173 A1    12/2010  Marinier et al.
2013/0194995 A1*    8/2013  Reinhardt ......... H04W 52/0209
                                                        370/311
(Continued)

FOREIGN PATENT DOCUMENTS

EP         2028781 A1      2/2009
WO     2010147956 A2    12/2010
(Continued)

OTHER PUBLICATIONS

Author Unknown, "Technical Specification Group Radio Access Network; Evolved Universal Terrestrial Radio Access (E-UTRA); Medium Access Control (MAC) protocol specification (Release 13)," Technical Specification 36.321, Version 13.2.0, Jun. 2016, 3GPP Organizational Partners, 91 pages.
(Continued)

*Primary Examiner* — Afshawn M Towfighi
(74) *Attorney, Agent, or Firm* — Withrow & Terranova, PLLC

(57) ABSTRACT

A method in a user equipment (110) comprises receiving (604) a grant (305, 405, 505), the grant scheduling one or more dynamically-delayed transmissions (310A-C, 410A-C, 510A-C) for the user equipment. The method comprises in response to receiving the grant, starting (608) a timer associated with dynamically-delayed scheduling, wherein at least one of a start time of the timer and a duration of the timer is configured such that the user equipment is active when an acknowledgement of the one or more dynamically-
(Continued)

delayed transmissions is expected to be received by the user equipment.

43 Claims, 12 Drawing Sheets

(51) Int. Cl.
*H04W 4/80* (2018.01)
*H04W 72/04* (2009.01)
*H04W 72/14* (2009.01)
*H04W 76/28* (2018.01)

(52) U.S. Cl.
CPC ....... *H04W 72/0446* (2013.01); *H04W 72/12* (2013.01); *H04W 72/14* (2013.01); *H04W 76/28* (2018.02)

(56) References Cited

U.S. PATENT DOCUMENTS

| | | | |
|---|---|---|---|
| 2016/0143017 A1 | 5/2016 | Yang et al. | |
| 2016/0360541 A1* | 12/2016 | Kim | H04W 76/23 |
| 2018/0324847 A1* | 11/2018 | Lunden | H04W 76/28 |

FOREIGN PATENT DOCUMENTS

| | | |
|---|---|---|
| WO | 2015169405 A1 | 11/2015 |
| WO | 2015198105 A1 | 12/2015 |

OTHER PUBLICATIONS

International Search Report and Written Opinion for International Patent Application No. PCT/IB2017/054998, dated Dec. 12, 2017, 12 pages.

Examination Report for European Patent Application No. 17769120.1, dated Dec. 3, 2020, 11 pages.

* cited by examiner

SCHEDULING TIMER

RELATED APPLICATIONS

This application is a national stage application of International Patent Application No. PCT/IB2017/054998, filed Aug. 17, 2017, which claims the benefit of U.S. provisional patent application Ser. No. 62/378,373, filed Aug. 23, 2016, the disclosures of which are hereby incorporated herein by reference in their entirety.

TECHNICAL FIELD

The present disclosure relates, in general, to wireless communications and, more particularly, to a scheduling timer.

BACKGROUND

Long Term Evolution (LTE) uses a type of dynamic scheduling referred to as single-subframe scheduling. In single-subframe scheduling, an uplink (UL) grant transmitted in the downlink (DL) grants a transmission in a single subframe of the UL. With dynamically-delayed scheduling, in contrast, a grant transmitted in the DL grants a transmission at a later time in the future. How far into the future the transmission is granted can vary depending on the grant. An example of dynamically delayed scheduling is multi-subframe scheduling. With multi-subframe scheduling, an UL grant transmitted in the DL grants one or more transmissions in several subframes of the UL FIG. 1 illustrates an example of multi-subframe scheduling. More particularly, FIG. 1 illustrates a plurality of DL transmissions 5A-5C and a plurality of UL transmissions 10A-H over a period of time 15 (in units of subframe). DL transmissions 5A-5C include grants (e.g., UL grants) transmitted in the DL (for example, to a user equipment (UE)), while UL transmissions 10A-H represent transmissions in the UL (e.g., to a network node, such as an eNB or gNB) and/or in the sidelink (e.g., to another wireless device) scheduled by a particular grant in one of DL transmissions 5A-5C.

FIG. 1 illustrates an example of multi-subframe scheduling in that each grant in DL transmissions 5A, 5B, and 5C schedules subsequent UL transmissions 10 in multiple subframes. For example, the grant in DL transmission 5A schedules UL transmissions 10A, 10B, 10C, and 10D (each in its respective subframe), and the grant in DL transmission 5B schedules UL transmissions 10E, 10F, 10G, and 10H (also in their respective subframes). The specific pattern of the grant in FIG. 1 that allows for four subsequent UL transmissions is an example only; other patterns are possible. The grant in each of DL transmissions 5A, 5B, and 5C contains information on which subframes the UE is allowed to transmit in the UL. It can be up to 16 subframes in various combinations.

Another type of scheduling that is being discussed is the so called "two-step scheduling." In this type of scheduling, a UE receives part of the scheduling information in a first step and part of the scheduling information in a second step. For example, it has been discussed to, at a first time/in a first step, provide information about modulation and coding schemes that should be used for a subsequent transmission, as well as frequency reduced, etc. However, at the first time/in the first step, the UE may not know exactly when the UE shall perform the transmission. At a later time/in a second step, the network node (e.g., eNB or gNB) would indicate to the UE when the scheduling information received in the first step is valid.

A UE may be configured with different Discontinuous Reception (DRX) configurations. In some cases, this may allow the UE to save battery power. When the UE is in DRX sleep, the UE does not need to listen on the Physical Downlink Control Channel (PDCCH). When the UE is in DRX active time, however, the UE listens on the PDCCH to wait for potential scheduling requests from the network node.

According to the $3^{rd}$ Generation Partnership Project (3GPP) Technical Specification (TS) 36.321 v13.2.0, the UE is in DRX active time when any of the conditions specified in Section 5.7 of the Medium Access Control (MAC) standard are true. As specified in Section 5.7, these conditions include:

| | | |
|---|---|---|
| 1 | DRX parameters are not configured; or | |
| 2 | DRX parameters are configured and | |
| | 2.1 | drx-InactivityTimer is running; or |
| | 2.2 | drx-RetransmissionTimer is running; or |
| | 2.3 | mac-ContentionResolutionTimer is running; or |
| | 2.4 | a Scheduling Request sent on PUCCH is pending; or |
| | 2.5 | an uplink grant for a pending HARQ retransmission can occur and there is data in the corresponding HARQ buffer; or |
| | 2.6 | a PDCCH indicating a new transmission addressed to the C-RNTI of the UE has not been received after successful reception of a Random Access Response for the explicitly signaled preamble (only applicable to UEs in RRC_CONNECTED). |
| Otherwise | | |
| 3 | It is the state when DRX sleep is used. | |

A UE in RRC_CONNECTED state that has been configured with the DRX function can be configured with both a long DRX cycle and a short DRX cycle. The intention with the long DRX cycle is that the UE should be able to sleep for a long time and only wake up periodically within DRX active time to listen for any new scheduling requests. The intention with the short DRX cycle is that the UE should be awake more frequently than in long DRX cycle to listen for any new scheduling requests. The time periods that the UE is awake to listen for scheduling requests are called OnDuration periods. The OnDuration periods are configured for a certain time duration during which the UE shall be awake.

When the UE is scheduled, a drx-InactivityTimer is started. While this timer is running, the UE is awake to listen for any new scheduling requests. When the drx-Inactivity-Timer expires, the UE will go to short DRX sleep, if configured. Otherwise, the UE will go to long DRX sleep. If the UE has not been scheduled for a configured number of short DRX cycles, the UE will go to long DRX sleep.

In some cases, such as when there is no cellular network communication, data can be sent from one device (e.g., a first UE) to another device (e.g., a second UE) without prior arrangement. This is referred to herein as sidelink communication (which may be interchangeably referred to as device-to-device (D2D) communication). Sidelink communication may advantageously reduce overhead and increase communication capacity of a network, which may be helpful or even crucial in emergency situations. The source device transmits data to one (e.g., unicast) or more (e.g., multicast/groupcast/broadcast) other devices, without first ensuring that the receiving devices are available and ready to receive the data.

One possible way to efficiently support D2D communication of data is to use a scheduling assignment (SA) followed by a data transmission. SAs are control messages used for direct scheduling of D2D communication. SAs are transmitted by the UE that intends to transmit D2D data, and are received by the UEs that are potentially interested in such data. SAs are transmitted on dedicated radio resources characterized by time and frequency, and are typically a sparse and limited resource. SAs provide useful information that can be used by the receiver, for example, to correctly decode the D2D data transmission(s) associated with the SA. This information may include, for example, resources for data transmission, modulation/coding parameters, timing information, identities for the transmitter and/or receiver, etc. Typically, but not necessarily, SAs are transmitted prior to the actual data transmission, so that a receiver can selectively receive data based on the content of the SAs. Data transmissions scheduled by a SA may be referred to as a "transmission pattern," which may indicate one or more subframes in which data transmissions occur. The SA is also known in the 3GPP standard as "Sidelink control information" (SCI). The content of the information transmitted in SCI is defined in 3GPP as SCI format 0. The transmission of SCI plus its associated D2D data is known as the "Sidelink Control period" (SC period).

In 3GPP Release 12, SCI is transmitted on the Physical Sidelink Control Channel (PSCCH). The D2D Data is transmitted on the Physical Sidelink Shared Channel (PSSCH).

To be able to better coordinate interference, the scheduling of D2D transmissions between UEs can be coordinated by the network node (e.g., eNB or gNB) when the UEs are in network coverage. In the 3GPP standard, this is called "Scheduled resource allocation" or "transmission mode 1." In transmission mode 1, the network node transmits a "sidelink grant" to the UE over the PDCCH that contains the radio resources the UE is allowed to use for transmission in the next SC period.

SUMMARY

To address problems with existing approaches, disclosed is a method in a user equipment. The method comprises receiving a grant, the grant scheduling one or more dynamically-delayed transmissions for the user equipment. The method comprises, in response to receiving the grant, starting a timer associated with dynamically-delayed scheduling, wherein at least one of a start time of the timer and a duration of the timer is configured such that the user equipment is active when an acknowledgement of the one or more dynamically-delayed transmissions is expected to be received by the user equipment.

In certain embodiments, the method may comprise determining, based on one or more criteria, whether the timer associated with dynamically-delayed scheduling should be used. The one or more criteria may comprise one or more of: network signaling; a type of cell on which the user equipment is scheduled; a type of scheduling used; and a type of grant used. In certain embodiments, the method may comprise performing at least one of the scheduled one or more dynamically-delayed transmissions, and receiving an acknowledgement for the at least one performed dynamically-delayed transmission before the timer associated with dynamically-delayed scheduling expires. In certain embodiments, the one or more dynamically-delayed transmissions may comprise a plurality of uplink transmissions scheduled in a plurality of subframes.

In certain embodiments, starting the timer associated with dynamically-delayed scheduling may comprise starting the timer when the user equipment performs one of the one or more dynamically-delayed transmissions scheduled by the received grant. In certain embodiments, starting the timer associated with dynamically-delayed scheduling may comprise starting the timer at a predefined time prior to performing one of the one or more dynamically-delayed transmissions scheduled by the received grant. In certain embodiments, starting the timer associated with dynamically-delayed scheduling may comprise starting the timer when the grant is received. The duration of the timer associated with dynamically-delayed scheduling may be extended such that the user equipment is active when an acknowledgement of the one or more dynamically-delayed transmissions is expected to be received. The duration of the timer associated with dynamically-delayed scheduling may be longer than another timer associated with grants that do not schedule dynamically-delayed transmissions.

In certain embodiments, the one or more dynamically-delayed transmissions may comprise one or more uplink transmissions, and the grant may be an uplink grant for the one or more uplink transmissions. In certain embodiments, the one or more dynamically-delayed transmissions may comprise one or more sidelink transmissions, and the grant may be a sidelink grant for the one or more sidelink transmissions.

In certain embodiments, receiving the grant may comprise receiving a first part of the grant at a first time, the first part of the grant comprising information about a modulation and coding scheme for the one or more dynamically-delayed transmissions scheduled for the user equipment, and receiving a second part of the grant at a second time, the second part of the grant indicating when the user equipment should perform the one or more dynamically-delayed transmissions. An amount of delay associated with the one or more dynamically-delayed transmissions may be indicated in at least one of the first part of the grant and the second part of the grant. In certain embodiments, starting the timer associated with dynamically-delayed scheduling may comprise starting the timer based on the first part of the grant. In certain embodiments, starting the timer associated with dynamically-delayed scheduling may comprise starting the timer based on the second part of the grant.

Also disclosed is a user equipment. The user equipment comprises processing circuitry. The processing circuitry is configured to receive a grant, the grant scheduling one or more dynamically-delayed transmissions for the user equipment. The processing circuitry is configured to, in response to receiving the grant, start a timer associated with dynamically-delayed scheduling, wherein at least one of a start time of the timer and a duration of the timer is configured such that the user equipment is active when an acknowledgement of the one or more dynamically-delayed transmissions is expected to be received by the user equipment.

Also disclosed is a method in a network node. The method comprises configuring a user equipment to start a timer associated with dynamically-delayed scheduling based on the user equipment receiving a grant scheduling one or more dynamically-delayed transmissions for the user equipment, wherein at least one of a start time of the timer and a duration of the timer is configured such that the user equipment is active when an acknowledgement of the one or more dynamically-delayed transmissions is expected to be received by the user equipment. The method comprises sending the grant to the user equipment.

In certain embodiments, the method may comprise determining, based on one or more criteria, whether the user equipment should be configured to use the timer associated with dynamically-delayed scheduling. The one or more criteria may comprise one or more of: a type of cell on which the user equipment is scheduled; a type of scheduling used; and a type of grant used. In certain embodiments, the one or more dynamically-delayed transmissions may comprise a plurality of uplink transmissions scheduled in a plurality of subframes.

In certain embodiments, configuring the user equipment to start the timer associated with dynamically-delayed scheduling based on the user equipment receiving a grant may comprise configuring the user equipment to start the timer associated with dynamically-delayed scheduling when the user equipment performs one of the one or more dynamically-delayed transmissions scheduled by the sent grant. In certain embodiments, configuring the user equipment to start the timer associated with dynamically-delayed scheduling based on the user equipment receiving a grant may comprise configuring the user equipment to start the timer associated with dynamically-delayed scheduling at a predefined time prior to performing one of the one or more dynamically-delayed transmissions scheduled by the sent grant. In certain embodiments, configuring the user equipment to start the timer associated with dynamically-delayed scheduling based on the user equipment receiving a grant may comprise configuring the user equipment to start the timer associated with dynamically-delayed scheduling when the user equipment receives the grant. The duration of the timer associated with dynamically-delayed scheduling may be extended such that the user equipment is active when an acknowledgement of the one or more dynamically-delayed transmissions is expected to be received. The duration of the timer associated with dynamically-delayed scheduling may be longer than another timer associated with grants that do not schedule dynamically-delayed transmissions.

In certain embodiments, the one or more dynamically-delayed transmissions may comprise one or more uplink transmissions, and the sent grant may be an uplink grant for the one or more uplink transmissions. In certain embodiments, the one or more dynamically-delayed transmissions may comprise one or more sidelink transmissions, and the sent grant may be a sidelink grant for the one or more sidelink transmissions.

In certain embodiments, sending the grant may comprise sending a first part of the grant at a first time, the first part of the grant comprising information about a modulation and coding scheme for the one or more dynamically-delayed transmissions scheduled for the user equipment, and sending a second part of the grant at a second time, the second part of the grant indicating when the user equipment should perform the one or more dynamically-delayed transmissions. An amount of delay associated with the one or more dynamically-delayed transmissions may be indicated in at least one of the first part of the grant and the second part of the grant. In certain embodiments, configuring the user equipment to start the timer associated with dynamically-delayed scheduling based on the user equipment receiving a grant may comprise configuring the user equipment to start the timer associated with dynamically-delayed scheduling based on the first part of the grant. In certain embodiments, configuring the user equipment to start the timer associated with dynamically-delayed scheduling based on the user equipment receiving a grant may comprise configuring the user equipment to start the timer associated with dynamically-delayed scheduling based on the second part of the grant.

Also disclosed is a network node. The network node comprises processing circuitry. The processing circuitry is configured to configure a user equipment to start a timer associated with dynamically-delayed scheduling based on the user equipment receiving a grant scheduling one or more dynamically-delayed transmissions for the user equipment, wherein at least one of a start time of the timer and a duration of the timer is configured such that the user equipment is active when an acknowledgement of the one or more dynamically-delayed transmissions is expected to be received by the user equipment. The processing circuitry is configured to send the grant to the user equipment.

Certain embodiments of the present disclosure may provide one or more technical advantages. For example, certain embodiments may advantageously avoid the timer expiring too early, which may advantageously improve the probability that the UE is awake when a Transport Control Protocol acknowledgement is being transmitted to the UE. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
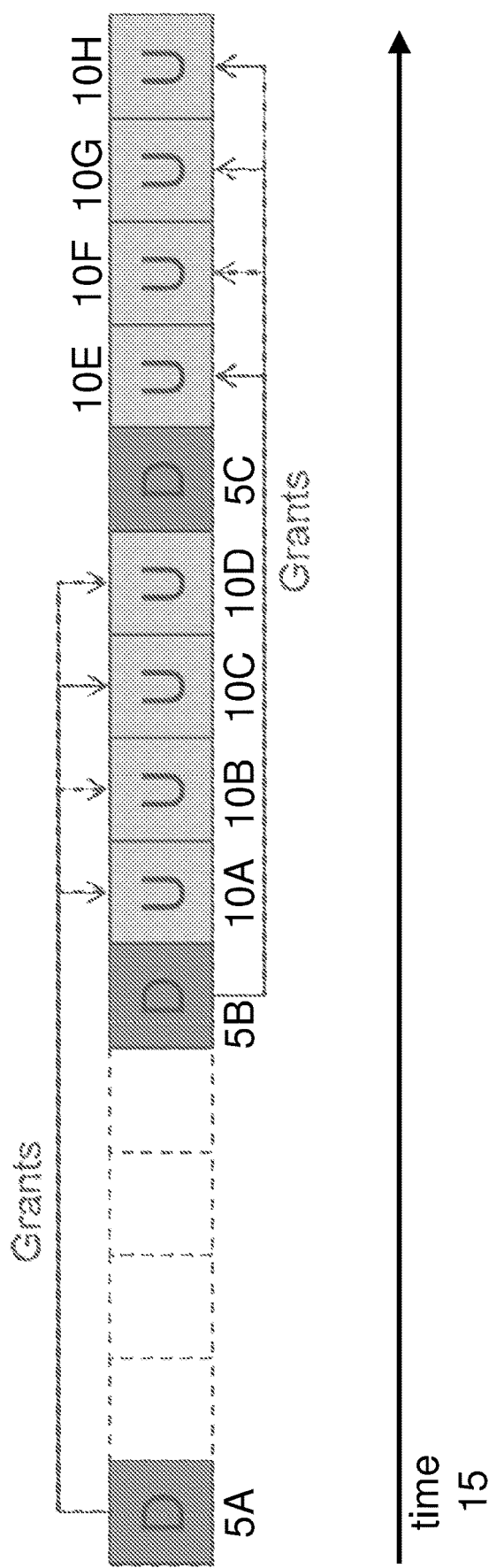
FIG. 1 illustrates an example of multi-subframe scheduling.

In many applications for mobile communication, the Transmission Control Protocol (TCP) is used. In the TCP protocol, the transmitter sends a packet to the receiver and the receiver responds with an acknowledgment (ACK) that it has successfully received the packet. In LTE, for example, an inactivity timer may be set to compensate for a round-trip time (RTT), such as the TCP RTT (i.e., for the time from when the transmitter sends data until it receives an ACK from the receiver).

According to current LTE operation, the UE starts an inactivity timer at the time the UE receives a grant for a new transmission. In single-subframe scheduling, there is a fixed time of 4 Transmission Time Intervals (TTIs) (or in the case of Time Division Duplex (TDD) a time which varies but is close to 4 TTIs) from the time when the UE receives the grant until the grant becomes valid (i.e., until the UE can perform the corresponding UL transmission). Hence, there is a fixed time (or a time with only small variations in the case of TDD) from when the UE receives a grant until that grant becomes valid. The duration of the inactivity timer is semi-statically configured using Radio Resource Control (RRC), and could therefore not easily be changed dynamically.

Starting the inactivity timer at reception of the grant works well in the case of single-subframe scheduling. This is due to the fixed (or with only small variations to the) time from grant reception until UL transmission. With other types of scheduling, however, the time from when the UE receives a grant until the grant becomes valid can vary significantly. This is true for dynamically-delayed scheduling, including, for example, multi-subframe scheduling. In such a scenario, starting the timer at reception of a grant may no longer be suitable because it may no longer compensate for the TCP RTT.

To illustrate, consider a scenario in which the RTT is assumed to be 20 milliseconds (ms) and hence the inactivity timer is set to a value in this order (e.g., 25 ms). If a UE receives a grant at time T=0 that becomes valid 15 ms later, then the UE will perform a transmission at time T=15 ms. The corresponding TCP feedback is expected to be received at T=15+20=35 ms. Because the inactivity timer is started at time T=0 and has a duration of 25 ms, however, the timer would expire before the expected TCP feedback and therefore the feedback would not be received while the UE is "awake" (i.e., monitoring PDCCH).

If the UE is not monitoring PDCCH when the corresponding TCP ACK should be provided to the UE, then the UE would need to wait until the next time the UE wakes up according to the DRX-configuration (e.g., until the next OnDuration). This increases latency, which may severely degrade TCP performance and hence user experience as well as system capacity. The present disclosure contemplates various embodiments that may address these and other deficiencies associated with existing approaches. The various embodiments described herein may avoid the timer expiring too early, which may advantageously improve the probability that the UE is awake when a TCP ACK (or other suitable information) is expected to be received by the UE.

According to one example embodiment, a method in a UE is disclosed. The UE receives a grant. The grant schedules one or more dynamically-delayed transmissions for the UE. The UE, in response to receiving the grant, starts a timer associated with dynamically-delayed scheduling. At least one of a start time of the timer and a duration of the timer is configured such that the UE is active when an ACK of the one or more dynamically-delayed transmissions is expected to be received by the UE.

In certain embodiments, the UE may start the timer when the UE performs one of the one or more dynamically-delayed transmissions scheduled by the received grant. In certain embodiments, the UE may start the timer at a predefined time prior to performing one of the one or more dynamically-delayed transmissions scheduled by the received grant. In certain embodiments, the UE may start the timer when the grant is received. In such a scenario, the duration of the timer associated with dynamically-delayed scheduling may be extended such that the UE is active when an ACK of the one or more dynamically-delayed transmissions is expected to be received, and the duration of the timer associated with dynamically-delayed scheduling may be longer than another timer associated with grants that do not schedule dynamically-delayed transmissions.

According to another example embodiment, a method in a network node is disclosed. The network node configures a UE to start a timer associated with dynamically-delayed scheduling based on the UE receiving a grant scheduling one or more dynamically-delayed transmissions for the UE, wherein at least one of a start time of the timer and a duration of the timer is configured such that the UE is active when an ACK of the one or more dynamically-delayed transmissions is expected to be received by the UE. The processing circuitry is configured to send the grant to the UE.

In certain embodiments, the network node configures the UE to start the timer associated with dynamically-delayed scheduling when the UE performs one of the one or more dynamically-delayed transmissions scheduled by the sent grant. In certain embodiments, the network node configures the UE to start the timer associated with dynamically-delayed scheduling at a predefined time prior to performing one of the one or more dynamically-delayed transmissions scheduled by the sent grant. In certain embodiments, the network node configures the UE to start the timer associated with dynamically-delayed scheduling when the UE receives the grant. In such a scenario, the duration of the timer associated with dynamically-delayed scheduling may be extended such that the UE is active when an ACK of the one or more dynamically-delayed transmissions is expected to be received, and the duration of the timer associated with dynamically-delayed scheduling may be longer than another timer associated with grants that do not schedule dynamically-delayed transmissions.

Figure 2:
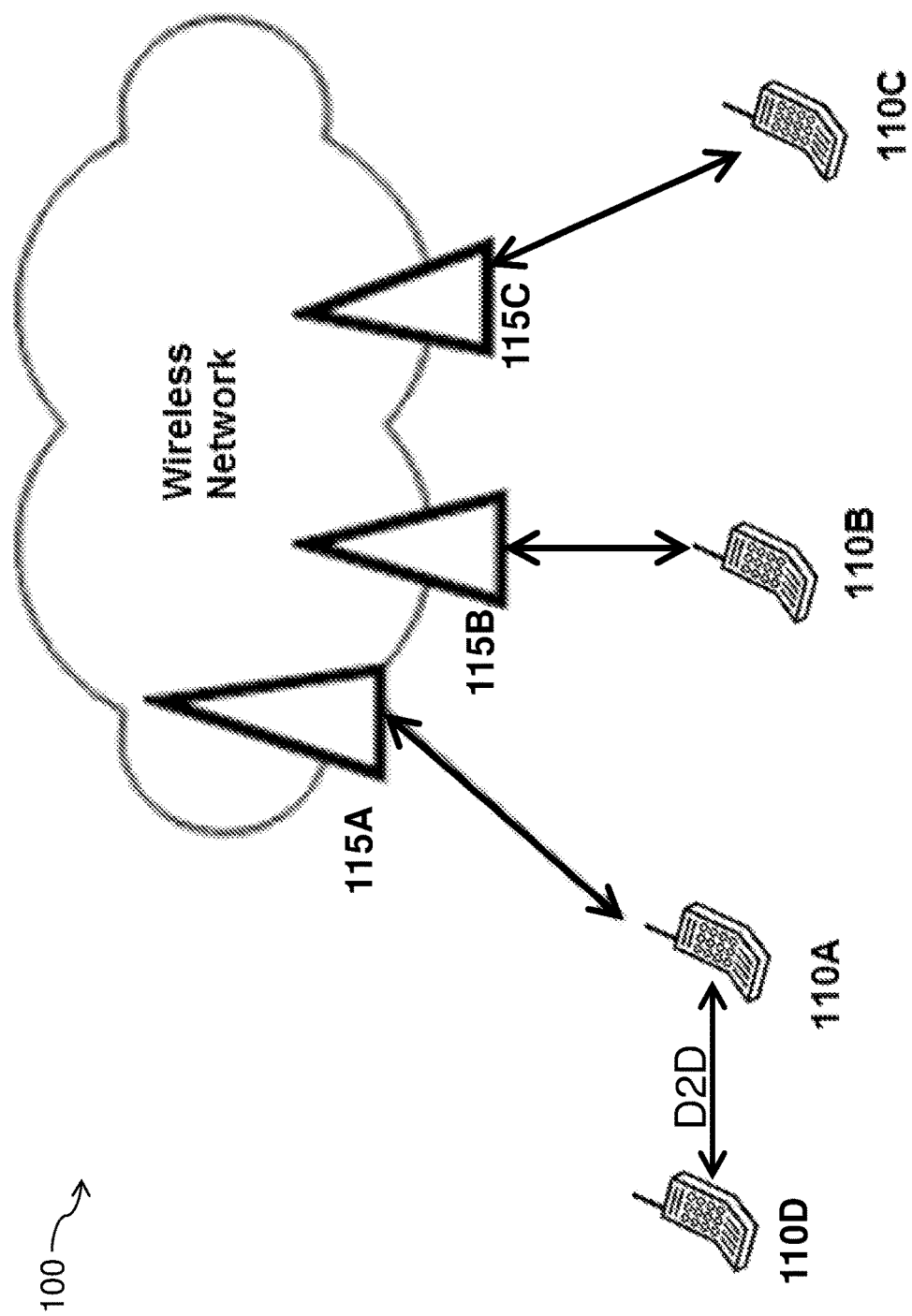
FIG. 2 is a block diagram illustrating an embodiment of a network, in accordance with certain embodiments.

FIG. 2 is a block diagram illustrating an embodiment of a network 100, in accordance with certain embodiments. Network 100 includes one or more UE(s) 110 (which may be interchangeably referred to as wireless devices 110) and one or more network node(s) 115 (e.g., eNBs or gNBs). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have D2D capability. Thus, UEs 110 may be able to receive signals from and/or transmit signals directly to another UE. For example, UE 110A may be able to transmit and/or receive SAs and/or data from UE 110D, and vice versa.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more UEs 110, and one or more different types of network nodes 115 capable of communicating (directly or indirectly) with UEs 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine-to-machine communication (M2M), low-cost and/or low-complexity UE, a sensor or actuator equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology "network node" is used. It can be any kind of network node, which may comprise a base station (BS), radio BS, Node B, multi-standard radio (MSR) radio node such as MSR BS, evolved Node B (eNB), gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/Multicast Coordination Entity (MCE), core network node (e.g., Mobile Switching Center (MSC), Mobility Management Entity (MME), etc.), Operations & Management (O&M), Operations Support System (OSS), Self-Organizing Network (SON), positioning node (e.g., Evolved Serving Mobile Location Center (E-SMLC)), Minimization of Drive Test (MDT), or any other suitable network node.

The terminology such as network node and UE should be considered non-limiting and does not imply a certain hierarchical relation between the two. In general, "network node" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 8-12.

Although FIG. 2 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to New Radio (NR), Narrowband Internet-of-Things (NB-IoT), LTE, LTE-Advanced, 5G, UMTS, HSPA, GSM, cdma2000, WCDMA, WiMax, UMB, WiFi, 802.11n, another suitable RAT, or any suitable combination of one or more RATs. Although certain embodiments may be described in the context of wireless transmissions in either the DL or the UL, the present disclosure contemplates that the various embodiments are equally applicable to both the DL and UL.

Moreover, although certain example embodiments are described herein, the scope of the present disclosure is not limited to these example embodiments. For example, although certain embodiments are described for dynamically-delayed scheduling or, in particular examples, multi-subframe scheduling, the present disclosure is not limited to these types of scheduling. Rather, the present disclosure contemplates that the various embodiments described herein are applicable to any suitable type of scheduling. Likewise, although certain embodiments may be described using examples in which a UE is provided with so-called "multi-subframe grants" where the UE can in one subframe receive grants valid in multiple subframes, the present disclosure is not limited to such an example. Rather, the present disclosure contemplates that the various embodiments described herein are applicable to other types of granting mechanisms (e.g., scheduling assignments or sidelink grants for sidelink transmissions, or any other suitable type of grant).

Similarly, although certain embodiments are described using examples in which a UE starts an inactivity timer, the present disclosure is not limited to such examples. Rather, the present disclosure contemplates that the various embodiments described herein are applicable to other systems in which another timer is used for a similar purpose (e.g., monitoring a channel), and that the various embodiments described herein are applicable to other timers. In addition, the various embodiments described herein may be used to restart the timer, as well as starting the timer.

As described above, if a UE 110 (e.g., UE 110A) is not monitoring the appropriate channel (e.g., PDCCH) when an ACK should be provided to UE 110A, then UE 110A would need to wait until the next time UE 110A wakes up (e.g., according to the DRX-configuration). This increases latency, which may severely degrade performance, user experience and system capacity. The present disclosure contemplates various embodiments that may address these and other deficiencies associated with existing approaches, for example by avoiding a timer expiring too early, thereby improving the probability that UE 110A is awake when an ACK (or other suitable information) is expected to be received by UE 110A.

In certain embodiments, UE 110A receives a grant. UE 110A may receive the grant from any suitable network entity. As one example, UE 110A may receive the grant from a network node 115, such as network node 115A. As another example, UE 110A may receive the grant from another UE 110, such as UE 110D. The grant may contain any suitable information. In certain embodiments, the grant schedules one or more transmissions for UE 110A. The one or more transmissions for UE 110A may be any suitable transmissions. As one example, the one or more transmissions may be dynamically-delayed transmissions for UE 110A. In some cases, the one or more dynamically-delayed transmissions may be one or more UL transmissions. In such a scenario, the grant may be an UL grant for the one or more UL transmissions. As a particular example, the one or more dynamically-delayed transmissions may be a plurality of UL transmissions scheduled in a plurality of subframes. In some cases, the one or more dynamically-delayed transmissions may be one or more sidelink transmissions. In such a scenario, the grant may be a scheduling assignment or sidelink grant for the one or more sidelink transmissions.

In certain embodiments, UE 110A may receive a first part of the grant at a first time. The first part of the grant may include information about a modulation and coding scheme for the one or more transmissions (e.g., dynamically-delayed transmissions) scheduled for UE 110A. UE 110A may receive a second part of the grant at a second time. The second part of the grant may indicate when UE 110A should perform the one or more transmissions. For example, in certain embodiments reception of the second part of the grant may itself be an indication of when UE 110A should perform the one or more transmissions. In such a scenario, the transmission time of the one or more transmissions may be derived/deduced from the reception time of the second part of the grant. As another example, in certain embodiments the second part of the grant may include information indicating when UE 110A should perform the one or more transmissions. In some cases, an amount of delay associated with the one or more dynamically-delayed transmissions may be indicated in at least one of the first part of the grant and the second part of the grant.

In response to receiving the grant, UE 110A starts a timer. In certain embodiments, UE 110A may be awake and monitor one or more channels (e.g., PDCCH in the case of LTE) while the timer is running. The timer may be any suitable type of timer. For example, in some cases the timer may be an inactivity timer. In certain embodiments, the timer may be applicable to all types of scheduling. In certain embodiments, the timer may be associated with a particular type of scheduling. For example, in some cases the timer may be associated with dynamically-delayed scheduling (e.g., multi-subframe scheduling). At least one of a start time of the timer and a duration of the timer may be configured such that UE 110A is active when an ACK of the one or more transmissions (e.g., one or more dynamically-delayed transmissions) is expected to be received by UE 110A.

UE 110A may start (or restart) the timer in any suitable manner. For example, in certain embodiments, UE 110A may start the timer when UE 110A performs one of the one or more transmissions scheduled by the received grant. Such an example embodiment is described in more detail below in relation to FIG. 3.

As another example, in certain embodiments UE 110A may start the timer when the grant is received. In such a scenario, the duration of the timer (which may be associated with dynamically-delayed scheduling) may be extended such that the UE is active when an ACK of the one or more transmissions is expected to be received, and the duration of the timer associated with dynamically-delayed scheduling may be longer than another timer associated with grants that do not schedule dynamically-delayed transmissions. Such an example embodiment is described in more detail below in relation to FIG. 4.

As still another example, in certain embodiments UE 110A may start the timer at a predefined time prior to performing one of the one or more transmissions scheduled by the received grant. Such an example embodiment is described in more detail below in relation to FIG. 5.

As described above, in some cases UE 110A may receive the grant in two parts. In some cases, UE 110A may start the timer based on the first part of the grant. In other cases, UE 110A may start the timer based on the second part of the grant.

In certain embodiments, a network node (e.g., network node 115A in the example of FIG. 2) may configure UE 110A to start the timer based on UE 110A receiving a grant scheduling one or more transmissions for UE 110A. As described above, at least one of a start time of the timer and a duration of the timer may be configured such that UE 110A is active when an ACK of the one or more transmissions is expected to be received by UE 110A.

In certain embodiments, UE 110A may determine whether the timer behaviors described herein should be used. As one non-limiting example, UE 110A may determine whether a timer associated with dynamically-delayed scheduling should be used. In some cases, the determination may be based on one or more criteria. The one or more criteria may be any suitable criteria. For example, in certain embodiments the one or more criteria may include one or more of: network signaling; a type of cell on which UE 110A is scheduled; a type of scheduling used; a type of grant used; and any other suitable criteria. The various criteria are described in more detail below.

As one example, UE 110A may determine whether the timer behaviors described herein should be used based on signaling from the network. In certain embodiments, UE 110A may apply any one or more of the timer behaviors described above based on network configuration. This may advantageously allow a network node (e.g., eNB or gNB) to configure whether UE 110A shall apply one or more of the timer behaviors described above.

As another example, UE 110A may determine whether the timer behaviors described herein should be used based on the type of cell on which UE 110A is scheduled. In certain embodiments, UE 110A may only apply one or more of the timer behaviors described above when scheduled on certain types of cells. As a non-limiting example, UE 110A may only apply one or more of the timer behaviors described above when UE 110A is scheduled on serving cells that apply Frame Structure 3 (which may be referred to as License Assisted Access (LAA) cells). Thus, if UE 110A is scheduled on a serving cell operating according to Frame Structure 3, UE 110A may apply one or more of the behaviors described above. In some cases, this may be without regard to the type of scheduling used. If, however, UE 110A is scheduled on a serving cell operating according to another Frame Structure, UE 110A would not apply one or more of the behaviors described above.

As still another example, UE 110A may determine whether the timer behaviors described herein should be used based on the type of scheduling that is used. In certain embodiments, UE 110A may apply the embodiments described above depending on which type of scheduling is used. As a non-limiting example, UE 110A may only apply the timer behaviors described herein if multi-subframe scheduling is used, but not if other types of scheduling is used. As another example, UE 110A may determine that the timer described herein should be used when any form of dynamically-delayed scheduling is used to schedule UE 110A, and/or determine that a legacy timer should be used when dynamically-delayed scheduling is not used to schedule UE 110A.

As yet another example, UE 110A may determine whether the timer behaviors described herein should be used based on the type of grant used. In certain embodiments, UE 110A may apply the timer behaviors described herein depending on which type of grant is received. As a non-limiting example, in some cases UE 110A may only apply the behavior if the grant is a sidelink grant.

The present disclosure contemplates that the UE may receive signaling from the network and/or determine any of the above described criteria or related information (e.g., a configuration for the timer behaviors in the UE, the type of cell on which the UE is scheduled on, the type of scheduling which is used, and/or the type of grant used) in any suitable manner.

Although particular examples have been described, the present disclosure contemplates that the above-described criteria and any other suitable criteria may be used in any suitable manner to govern application of the timer behaviors described herein. In certain embodiments, UE 110A may take into account any suitable combination of criteria in order to determine whether the timer described herein should be used.

Similarly, network node 115A may determine whether UE 110A should be configured to use the timer behaviors described above. This determination by network node 115A may be based on any suitable criteria, including the criteria described above in relation to the determination by UE 110A regarding whether the timer behaviors described herein should be used.

In certain embodiments, UE 110A performs at least one of the scheduled one or more transmissions. As one example, UE 110A may perform at least one UL transmission to a network node (e.g., network node 115A). As another example, UE 110A may perform at least one sidelink transmission to another UE 110 (e.g., UE 110D). The at least one transmission may have been scheduled using dynamically-delayed scheduling. In certain embodiments, UE 110A receives an ACK for the at least one performed transmission before the timer expires.

Figure 3:
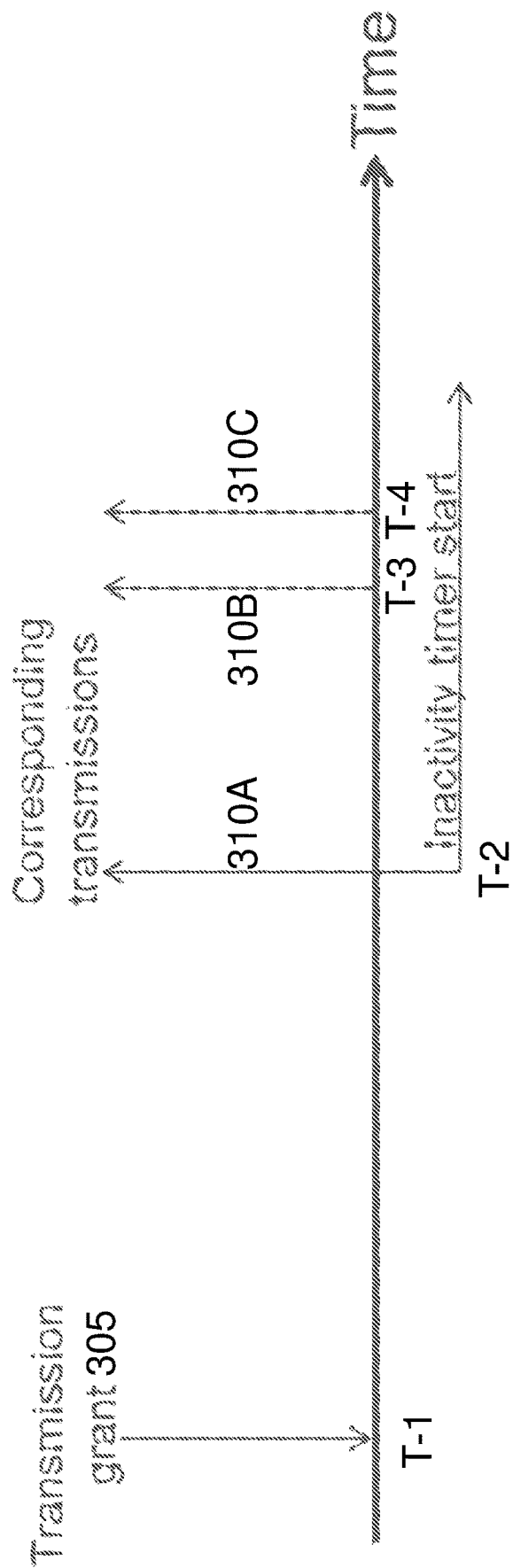
FIG. 3 illustrates an example in which the timer is started when the UE performs the first transmission, in accordance with certain embodiments.

FIG. 3 illustrates an example in which the timer is started when the UE performs the first transmission, in accordance with certain embodiments. As described above, with some types of scheduling, such as dynamically-delayed scheduling (e.g., multi-subframe scheduling), the UE may receive grants that are applicable to several time occasions. In the example of FIG. 3, a UE receives transmission grant 305 at time T-1. Transmission grant 305 schedules corresponding transmissions 310A, 310B, and 310C at future times T-2, T-3, and T-4, respectively. Unlike the existing approach in LTE (in which the UE starts an inactivity timer when the UE receives the grant(s)), in the example of FIG. 3 the UE starts the inactivity timer when the UE performs one of the transmissions 310 corresponding to transmission grant 305.

In the particular example of FIG. 3, the UE starts the timer at time T-2 when the UE performs the first corresponding transmission 310A. In other embodiments, the UE may start the timer when the UE performs the second corresponding transmission 310B or the third corresponding transmission 310C.

As described above, in certain embodiments transmission grant 305 may be an UL grant, and corresponding transmissions 310A, 310B, and 310C may be UL transmissions. In certain embodiments, transmission grant 305 may be a sidelink grant and corresponding transmissions 310A, 310B, and 310C may be sidelink transmissions. In certain embodiments, rather than receiving a grant (e.g., from a network node) the UE may transmit a SA and the timer behaviors described herein may be based on when the UE transmits the SA and/or the timing of one or more transmissions scheduled by the SA.

An example way of implementing the example embodiment of FIG. 3 in the LTE MAC specification (3GPP TS 36.321 v13.2.0, Section 5.7) is described below:

Current text from 36.321 v13.2.0:
  if the PDCCH indicates a new transmission (DL, UL or SL):
    except for NB-IoT, start or restart drx-InactivityTimer.
First example implementation of this embodiment:
  if the PDCCH has indicated a new transmission (DL, UL or SL) in this subframe:
    except for NB-IoT, start or restart drx-InactivityTimer.
Second example implementation of this embodiment:
  if the PDCCH indicates a new transmission (DL, UL or SL) with a single-
transmission grant:
    except for NB-IoT, start or restart drx-InactivityTimer.
  if the PDCCH has indicated a new transmission (DL, UL or SL) in this subframe with a multi-subframe grant:
    except for NB-IoT, start or restart drx-InactivityTimer.

Figure 4:
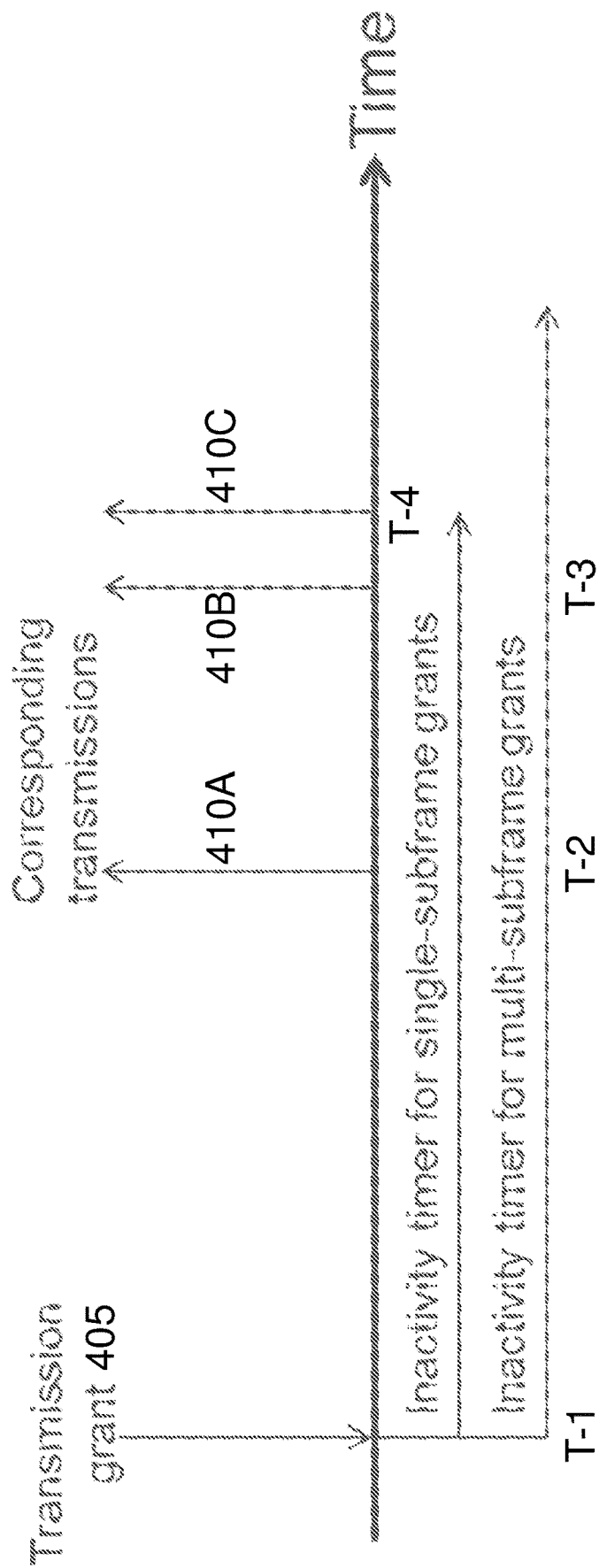
FIG. 4 illustrates an example in which the duration of the timer is longer for multi-subframe grants than for single-subframe grants, in accordance with certain embodiments.

FIG. 4 illustrates an example in which the duration of the timer is longer for multi-subframe grants than for single-subframe grants, in accordance with certain embodiments. As described above, in the existing LTE approach an UL grant is valid for 4 TTIs after the UE receives the grant (for TDD subframe structures this value is sometimes different but is close to 4 TTIs). In cases of multi-subframe scheduling, however, the UE may receive a grant scheduling one or more transmissions much later than 4 TTIs. In the example of FIG. 4, a UE receives transmission grant 405 at time T-1. Transmission grant 405 schedules corresponding transmissions 410A, 410B, and 410C at future times T-2, T-3, and T-4, respectively. Similar to the existing approach in LTE (in which the UE starts an inactivity timer when the UE receives the grant(s)), in the example of FIG. 4 the UE starts the inactivity timer at time T-1 when the UE receives transmission grant 405. However, unlike the existing approach in LTE, the UE starts a timer associated with multi-subframe scheduling that has an extended duration (as compared to the legacy timer used for single-subframe scheduling). This may advantageously allow the UE to compensate for a grant that becomes valid later than 4 TTIs.

The time duration with which the timer is extended may depend on any suitable criteria. For example, in certain embodiments the time duration with which the timer is extended may depend on how far into the future the grant is valid. In multi-subframe scheduling, for example, the UL grant may be valid up to 16 TTIs after the grant was received. One possible implementation of the example embodiment of FIG. 4 is that the timer is extended by a value [(validity time)−(reception time)+constant], where: validity time is the time where the grant is valid (i.e., the time when the UE can transmit using the grant); reception time is the time when the grant was received; and the constant could be either positive or negative.

In some cases, the determining factor between using different timer durations may be the time at which the grant becomes valid. For example, if a grant becomes valid at a first time T1 after the grant was received, the UE applies a first timer duration. If, however, a grant becomes valid a second time T2 after the grant was received, the UE applies a second timer duration. It is possible, even with a multi-subframe grant, that the UE may receive a grant valid 4 TTIs later. In this case, the UE may apply the first timer duration. However, if the UE receives a grant valid at a later point in time then the UE applies a second timer duration. The second timer duration may be longer than the first timer duration. In certain embodiments, the determination may be based on whether the amount of time before the grant becomes valid is above a threshold (e.g., a threshold amount of time or threshold number of TTIs).

As described above, in certain embodiments transmission grant 405 may be an UL grant, and corresponding transmissions 410A, 410B, and 410C may be UL transmissions. In certain embodiments, transmission grant 405 may be a sidelink grant and corresponding transmissions 410A, 410B, and 410C may be sidelink transmissions. In certain embodiments, rather than receiving a grant (e.g., from a network node) the UE may transmit a SA and the timer behaviors described herein may be based on when the UE transmits the SA and/or the timing of one or more transmissions scheduled by the SA.

An example way of implementing the example embodiment of FIG. 4 in the LTE MAC specification (3GPP TS 36.321 v13.2.0, Section 5.7) is described below:

Current text:
    if the PDCCH indicates a new transmission (DL, UL or SL):
        except for NB-IoT, start or restart drx-InactivityTimer.
First example implementation of this embodiment:
    if the PDCCH indicates a new transmission (DL, UL or SL):
        for a transmission using a single-subframe grant:
            except for NB-IoT, start or restart drx-InactivityTimer with the value X.
        for a transmission using a multi-subframe grant:
            except for NB-IoT, start or restart drx-InactivityTimer with the value X.
Second example implementation of this embodiment:(duration depends on multi-/single-subframe grant):
    if the PDCCH indicates a new transmission (DL, UL or SL):
        if the transmission was granted with a multi-subframe grant:
            except for NB-IoT, start or restart drx-InactivityTimer with the value X.
        else:
            except for NB-IoT, start or restart drx-InactivityTimer with the value Y.
Third example implementation of this embodiment (duration depends on when grant was received):
    if the PDCCH indicates a new transmission (DL, UL or SL):
        if the transmission was granted using a delayed grant:
            except for NB-IoT, start or restart drx-InactivityTimer with the value X.
        else:
            except for NB-IoT, start or restart drx-InactivityTimer with the value X.

Figure 5:
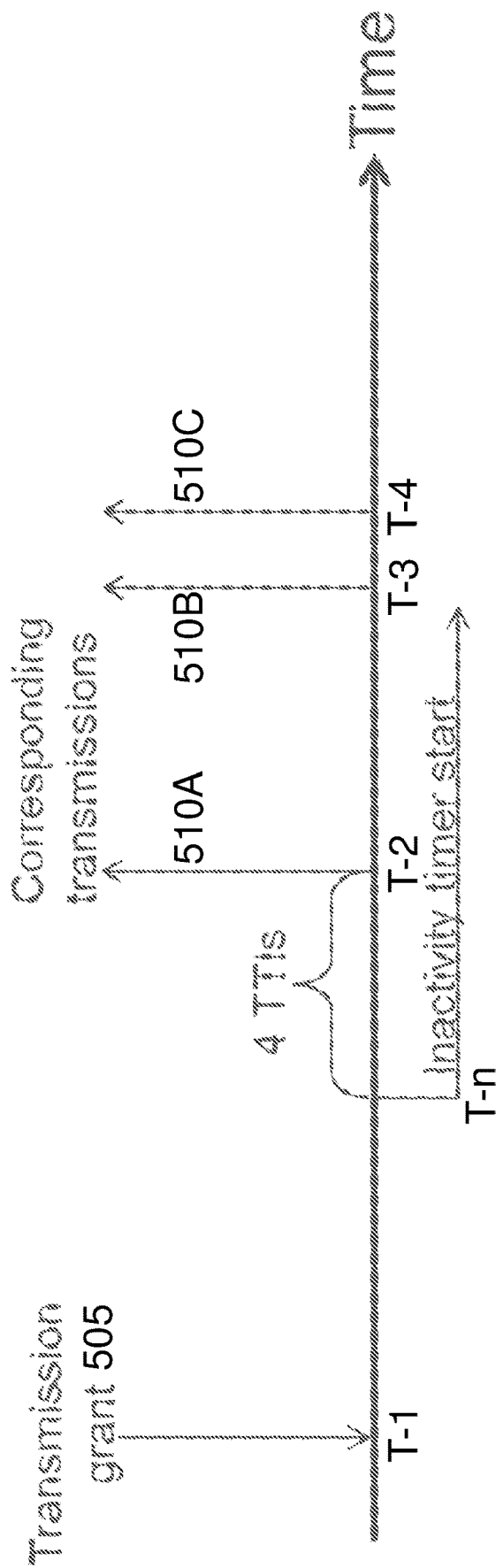
FIG. 5 illustrates an example in which the timer is started at a predefined time prior to the first transmission, in accordance with certain embodiments.

FIG. 5 illustrates an example in which the inactivity timer is started at a predefined time prior to the first transmission, in accordance with certain embodiments. In the example of FIG. 5, a UE receives transmission grant 505 at time T-1. Transmission grant 505 schedules corresponding transmissions 510A, 510B, and 510C at future times T-2, T-3, and T-4, respectively. Unlike the existing approach in LTE, in the example embodiment of FIG. 5 the UE starts the timer at a time T-n before corresponding transmission 510A.

The time T-n may be expressed in any suitable manner. For example, in certain embodiments the time T-n may be expressed in a number of TTIs. In the example of FIG. 5, the time T-n is 4 TTIs. If the UE performs a corresponding transmission 510 in TTI N, the UE would, according to this example embodiment, start the inactivity timer at time T-n=TTI N−4.

In some cases, the timer can also be started at a time after the UL transmission is performed.

As described above, in certain embodiments transmission grant 405 may be an UL grant, and corresponding transmissions 410A, 410B, and 410C may be UL transmissions. In certain embodiments, transmission grant 405 may be a sidelink grant and corresponding transmissions 410A, 410B, and 410C may be sidelink transmissions. In certain embodiments, rather than receiving a grant (e.g., from a network node) the UE may transmit a SA and the timer behaviors described herein may be based on when the UE transmits the SA and/or the timing of one or more transmissions scheduled by the SA.

An example way of implementing the example embodiment of FIG. 5 in the LTE MAC specification (3GPP TS 36.321 v13.2.0, Section 5.7) is described below:

```
Current text:
    if the PDCCH indicates a new transmission (DL, UL or SL):
        except for NB-IoT, start or restart drx-InactivityTimer.
First example implementation of this embodiment:
    if the PDCCH indicates a new transmission (DL, UL or SL) valid in N TTIs:
        except for NB-IoT, start or restart drx-InactivityTimer.
Second example implementation of this embodiment:
    if this is TTI N and the PDCCH has indicated a new transmission (DL, UL or
        SL)
    in TTI N-4:
        except for NB-IoT, start or restart drx-InactivityTimer.
```

The present disclosure contemplates that the various embodiments described herein can be combined in any suitable manner. For example, the embodiments described above in relation to FIG. 5 could be combined with those described above in relation to FIG. 3.

Note that although the description above provides examples of how the various embodiments described herein could be implemented in the LTE MAC standard, the present disclosure is not limited to these example embodiments.

Figure 6:
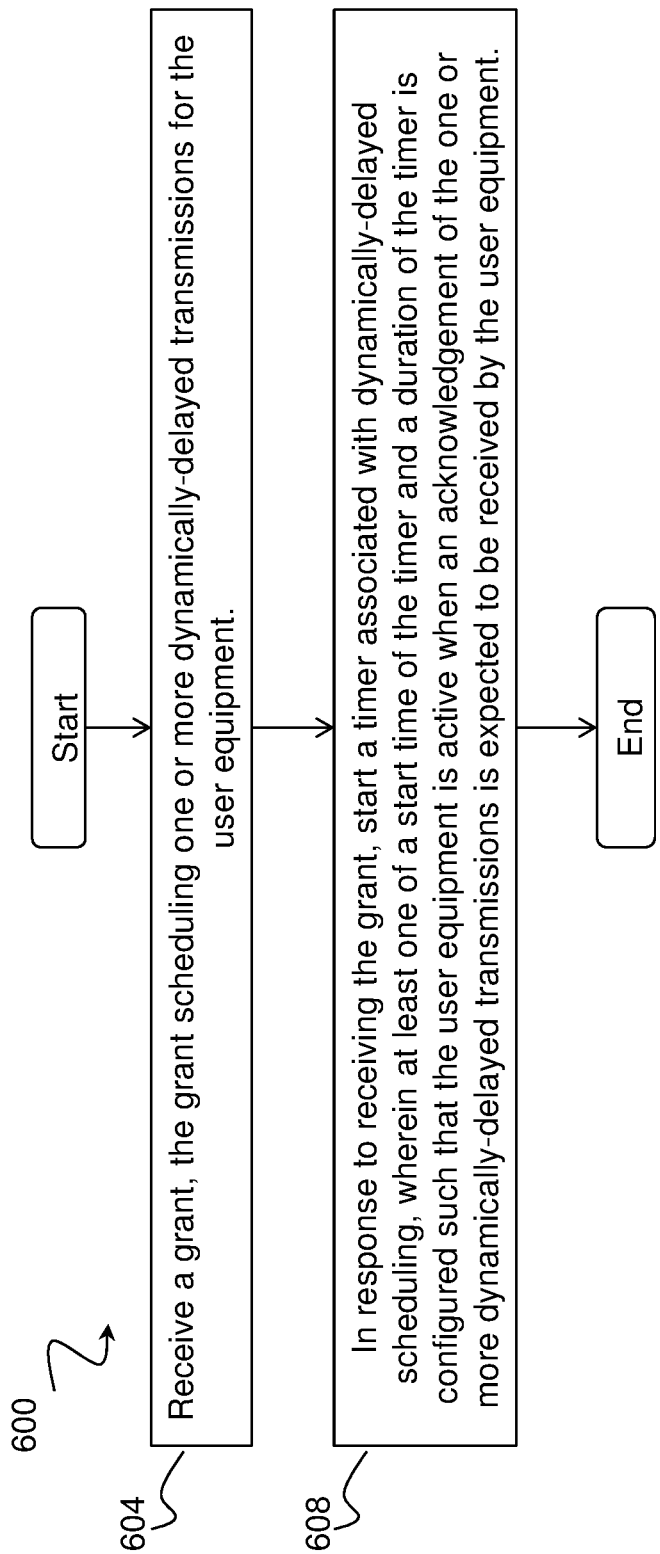
FIG. 6 is flow diagram of a method in a UE, in accordance with certain embodiments.

FIG. 6 is a flow diagram of a method 600 in a UE, in accordance with certain embodiments. Method 600 begins at step 604, where the UE receives a grant, the grant scheduling one or more dynamically-delayed transmissions for the UE. In certain embodiments, the one or more dynamically-delayed transmissions may comprise one or more UL transmissions, and the grant may be an UL grant for the one or more UL transmissions. In certain embodiments, the one or more dynamically-delayed transmissions may comprise one or more sidelink transmissions, and the grant may be a sidelink grant for the one or more sidelink transmissions. In certain embodiments, the one or more dynamically-delayed transmissions may comprise a plurality of UL transmissions scheduled in a plurality of sub frames.

In certain embodiments, receiving the grant may comprise receiving a first part of the grant at a first time, the first part of the grant comprising information about a modulation and coding scheme for the one or more dynamically-delayed transmissions scheduled for the UE, and receiving a second part of the grant at a second time, the second part of the grant comprising information indicating when the UE should perform the one or more dynamically-delayed transmissions. An amount of delay associated with the one or more dynamically-delayed transmissions may be indicated in at least one of the first part of the grant and the second part of the grant.

At step 608, the UE, in response to receiving the grant, starts a timer associated with dynamically-delayed scheduling, wherein at least one of a start time of the timer and a duration of the timer is configured such that the UE is active when an ACK of the one or more dynamically-delayed transmissions is expected to be received by the UE.

In certain embodiments, starting the timer associated with dynamically-delayed scheduling may comprise starting the timer when the UE performs one of the one or more dynamically-delayed transmissions scheduled by the received grant. In certain embodiments, starting the timer associated with dynamically-delayed scheduling may comprise starting the timer at a predefined time prior to performing one of the one or more dynamically-delayed transmissions scheduled by the received grant. In certain embodiments, starting the timer associated with dynamically-delayed scheduling may comprise starting the timer when the grant is received. The duration of the timer associated with dynamically-delayed scheduling may be extended such that the UE is active when an ACK of the one or more dynamically-delayed transmissions is expected to be received. The duration of the timer associated with dynamically-delayed scheduling may be longer than another timer associated with grants that do not schedule dynamically-delayed transmissions.

In certain embodiments, starting the timer associated with dynamically-delayed scheduling may comprise starting the timer based on the first part of the grant. In certain embodiments, starting the timer associated with dynamically-delayed scheduling may comprise starting the timer based on the second part of the grant.

In certain embodiments, the method may comprise determining, based on one or more criteria, whether the timer associated with dynamically-delayed scheduling should be used. The one or more criteria may comprise one or more of: network signaling; a type of cell on which the UE is scheduled; a type of scheduling used; and a type of grant used. In certain embodiments, the method may comprise performing at least one of the scheduled one or more dynamically-delayed transmissions, and receiving an ACK for the at least one performed dynamically-delayed transmission before the timer associated with dynamically-delayed scheduling expires.

Figure 7:
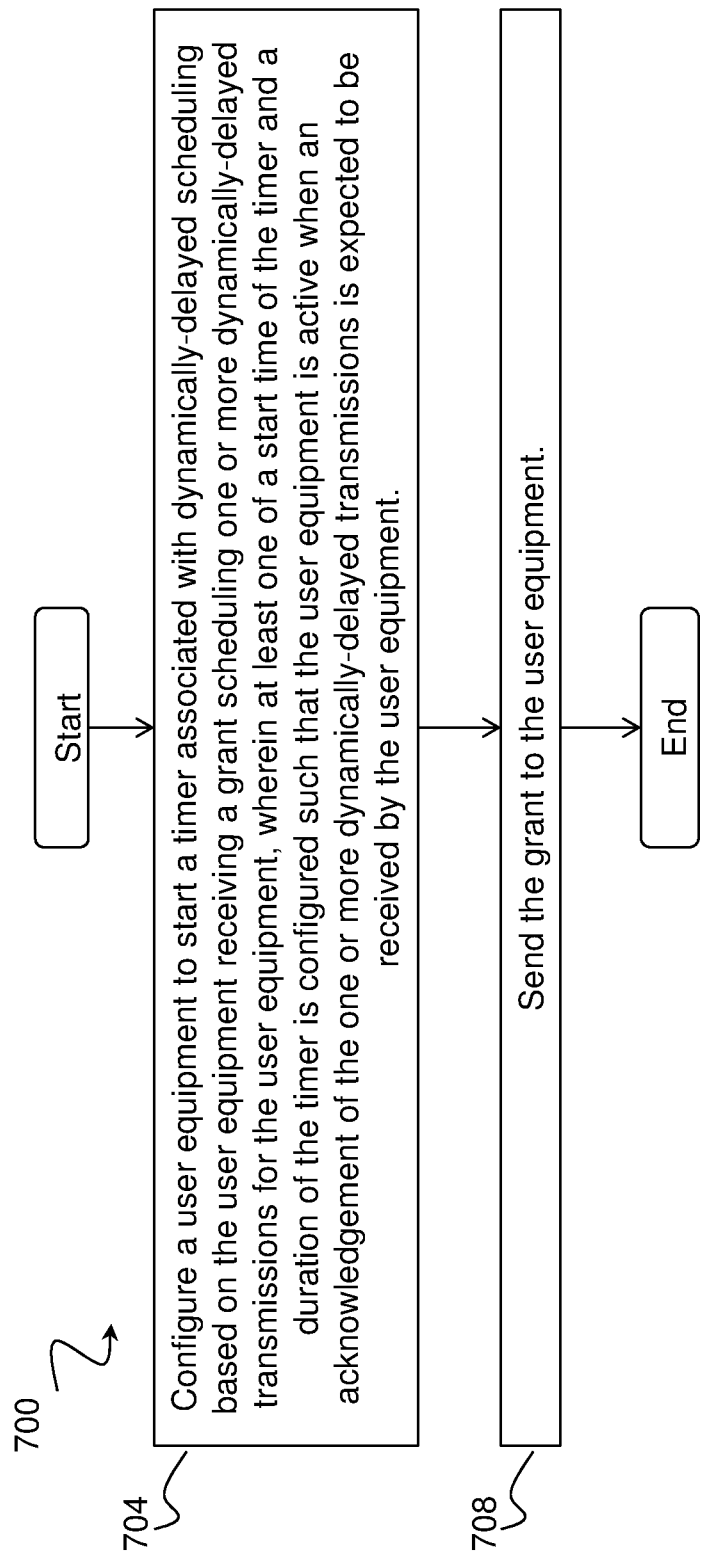
FIG. 7 is a flow diagram of a method in a network node, in accordance with certain embodiments.

FIG. 7 is a flow diagram of a method 700 in a network node, in accordance with certain embodiments. Method 700 begins at step 704, where the network node configures a UE to start a timer associated with dynamically-delayed scheduling based on the UE receiving a grant scheduling one or more dynamically-delayed transmissions for the UE, wherein at least one of a start time of the timer and a duration of the timer is configured such that the UE is active when an ACK of the one or more dynamically-delayed transmissions is expected to be received by the UE.

In certain embodiments, configuring the UE to start the timer associated with dynamically-delayed scheduling based on the UE receiving a grant may comprise configuring the UE to start the timer associated with dynamically-delayed scheduling when the UE performs one of the one or more dynamically-delayed transmissions scheduled by the sent grant. In certain embodiments, configuring the UE to start the timer associated with dynamically-delayed scheduling based on the UE receiving a grant may comprise configuring the UE to start the timer associated with dynamically-delayed scheduling at a predefined time prior to performing one of the one or more dynamically-delayed transmissions scheduled by the sent grant. In certain embodiments, configuring the UE to start the timer associated with dynamically-delayed scheduling based on the UE receiving a grant may comprise configuring the UE to start the timer associated with dynamically-delayed scheduling when the UE receives the grant. The duration of the timer associated with dynamically-delayed scheduling may be extended such that the UE is active when an ACK of the one or more dynamically-delayed transmissions is expected to be received. The duration of the timer associated with dynamically-delayed scheduling may be longer than another timer associated with grants that do not schedule dynamically-delayed transmissions.

In certain embodiments, the one or more dynamically-delayed transmissions may comprise one or more UL transmissions, and the sent grant may be an UL grant for the one or more UL transmissions. In certain embodiments, the one or more dynamically-delayed transmissions may comprise one or more sidelink transmissions; and the sent may be a sidelink grant for the one or more sidelink transmissions.

At step 708, the network node sends the grant to the UE. In certain embodiments, sending the grant may comprise sending a first part of the grant at a first time, the first part of the grant comprising information about a modulation and coding scheme for the one or more dynamically-delayed transmissions scheduled for the UE, and sending a second part of the grant at a second time, the second part of the grant comprising information indicating when the UE should perform the one or more dynamically-delayed transmissions. An amount of delay associated with the one or more dynamically-delayed transmissions may be indicated in at least one of the first part of the grant and the second part of the grant. In certain embodiments, configuring the UE to start the timer associated with dynamically-delayed scheduling based on the UE receiving a grant may comprise configuring the UE to start the timer associated with dynamically-delayed scheduling based on the first part of the grant. In certain embodiments, configuring the UE to start the timer associated with dynamically-delayed scheduling based on the UE receiving a grant may comprise configuring the UE to start the timer associated with dynamically-delayed scheduling based on the second part of the grant.

In certain embodiments, the method may comprise determining, based on one or more criteria, whether the UE should be configured to use the timer associated with dynamically-delayed scheduling. The one or more criteria may comprise one or more of: a type of cell on which the UE is scheduled; a type of scheduling used; and a type of grant used. In certain embodiments, the one or more dynamically-delayed transmissions may comprise a plurality of UL transmissions scheduled in a plurality of subframes.

Figure 8:
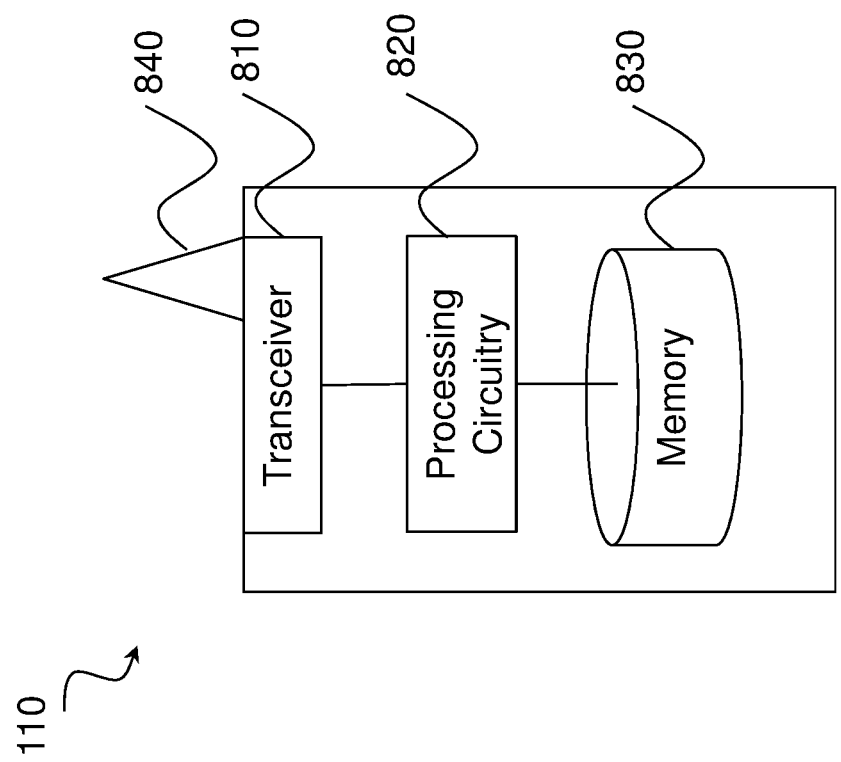
FIG. 8 is a block schematic of an exemplary wireless device, in accordance with certain embodiments.

FIG. 8 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 810, processing circuitry 820, and memory 830. In some embodiments, transceiver 810 facilitates transmitting wireless signals to and receiving wireless signals from network node 115 (e.g., via antenna 840), processing circuitry 820 executes instructions to provide some or all of the functionality described above as being provided by wireless device 110, and memory 830 stores the instructions executed by processing circuitry 820.

Processing circuitry 820 may include any suitable combination of hardware and software implemented in one or more modules to execute instructions and manipulate data to perform some or all of the described functions of wireless device 110, such as the functions of UE 110 described above in relation to FIGS. 1-7. In some embodiments, processing circuitry 820 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 830 is generally operable to store instructions, such as a computer program, software, an application including one or more of logic, rules, algorithms, code, tables, etc. and/or other instructions capable of being executed by processing circuitry 820. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 820.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 820. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 9:
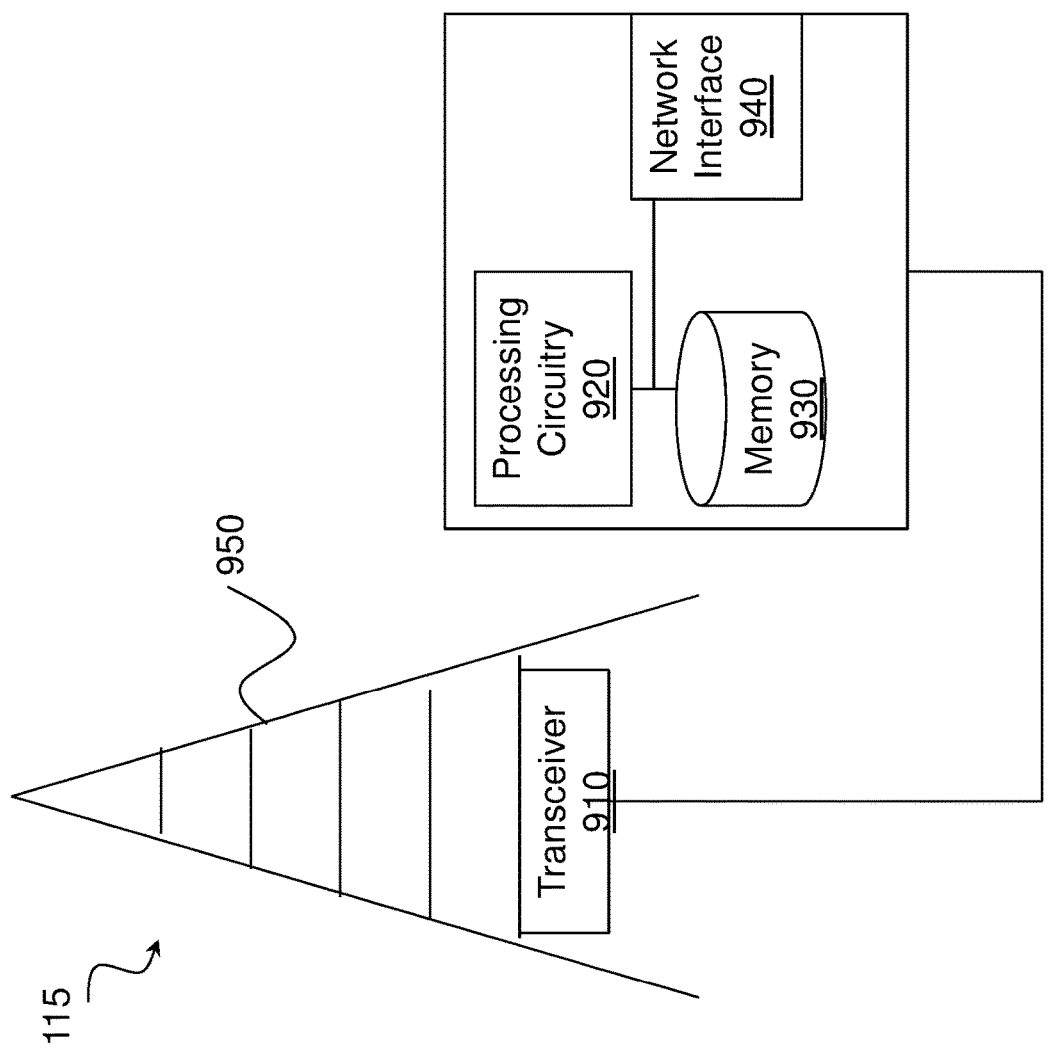
FIG. 9 is a block schematic of an exemplary network node, in accordance with certain embodiments.

FIG. 9 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 910, processing circuitry 920, memory 930, and network interface 940. In some embodiments, transceiver 910 facilitates transmitting wireless signals to and receiving wireless signals from wireless device 110 (e.g., via antenna 950), processing circuitry 920 executes instructions to provide some or all of the functionality described above as being provided by a network node 115, memory 930 stores the instructions executed by processing circuitry 920, and network interface 940 communicates signals to backend network components, such as a gateway, switch, router, Internet, Public Switched Telephone Network (PSTN), core network nodes or radio network controllers 130, etc.

Processing circuitry 920 may include any suitable combination of hardware and software implemented in one or more modules to execute instructions and manipulate data to perform some or all of the described functions of network node 115, such as those described above in relation to FIGS. 1-7. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by processing circuitry 920. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for network node 115, send output from network node 115, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of network node 115 may include additional components beyond those shown in FIG. 9 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 10:
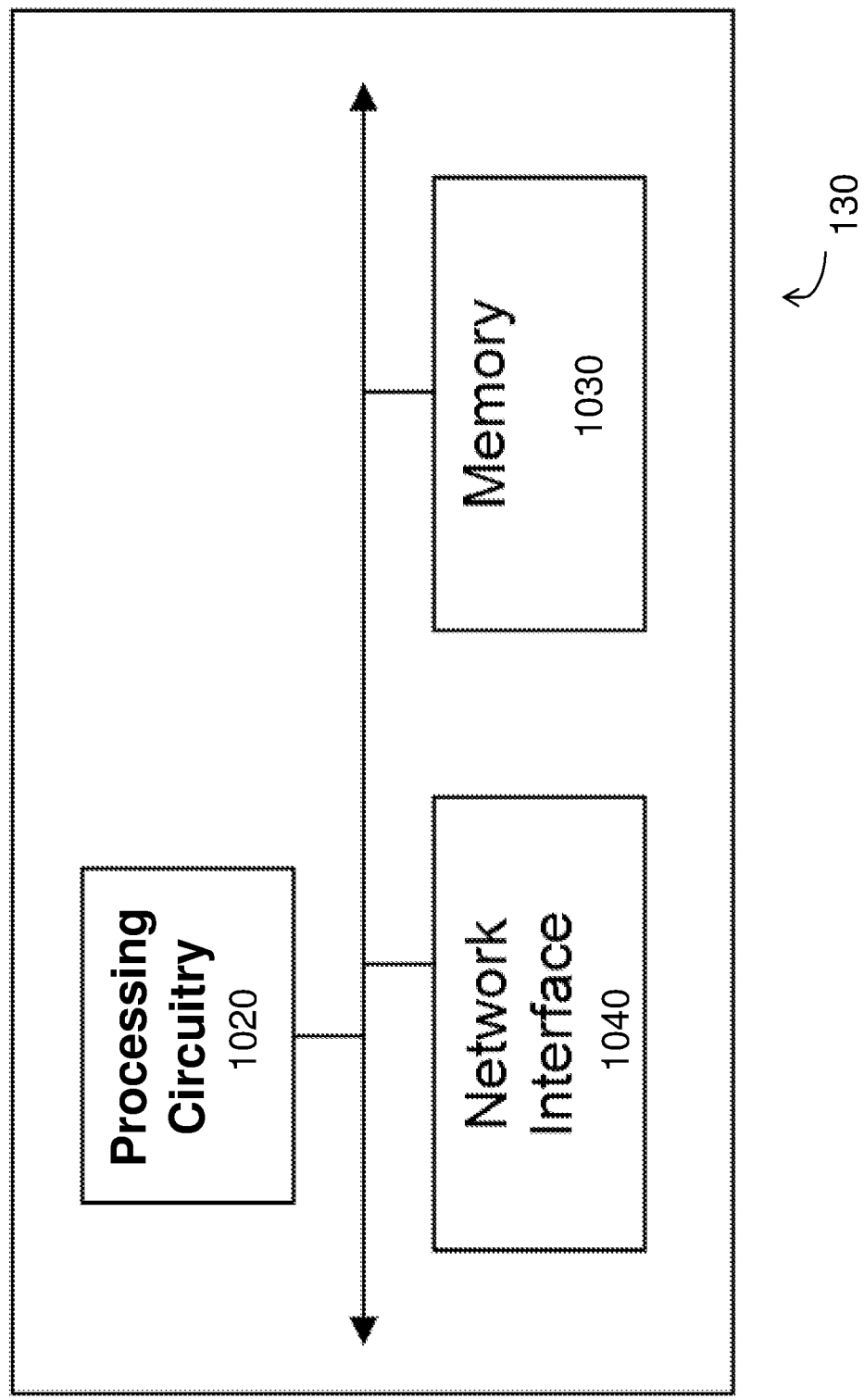
FIG. 10 is a block schematic of an exemplary radio network controller or core network node, in accordance with certain embodiments.

FIG. 10 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1020, memory 1030, and network interface 1040. In some embodiments, processing circuitry 1020 executes instructions to provide some or all of the functionality described above as being provided by the network node, memory 1030 stores the instructions executed by processing circuitry 1020, and network interface 1040 communicates signals to any suitable node, such as a gateway, switch, router, Internet, Public Switched Telephone Network (PSTN), network nodes 115, radio network controllers or core network nodes 130, etc.

Processing circuitry 1020 may include any suitable combination of hardware and software implemented in one or more modules to execute instructions and manipulate data to perform some or all of the described functions of the radio network controller or core network node 130. In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processing circuitry 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Figure 11:
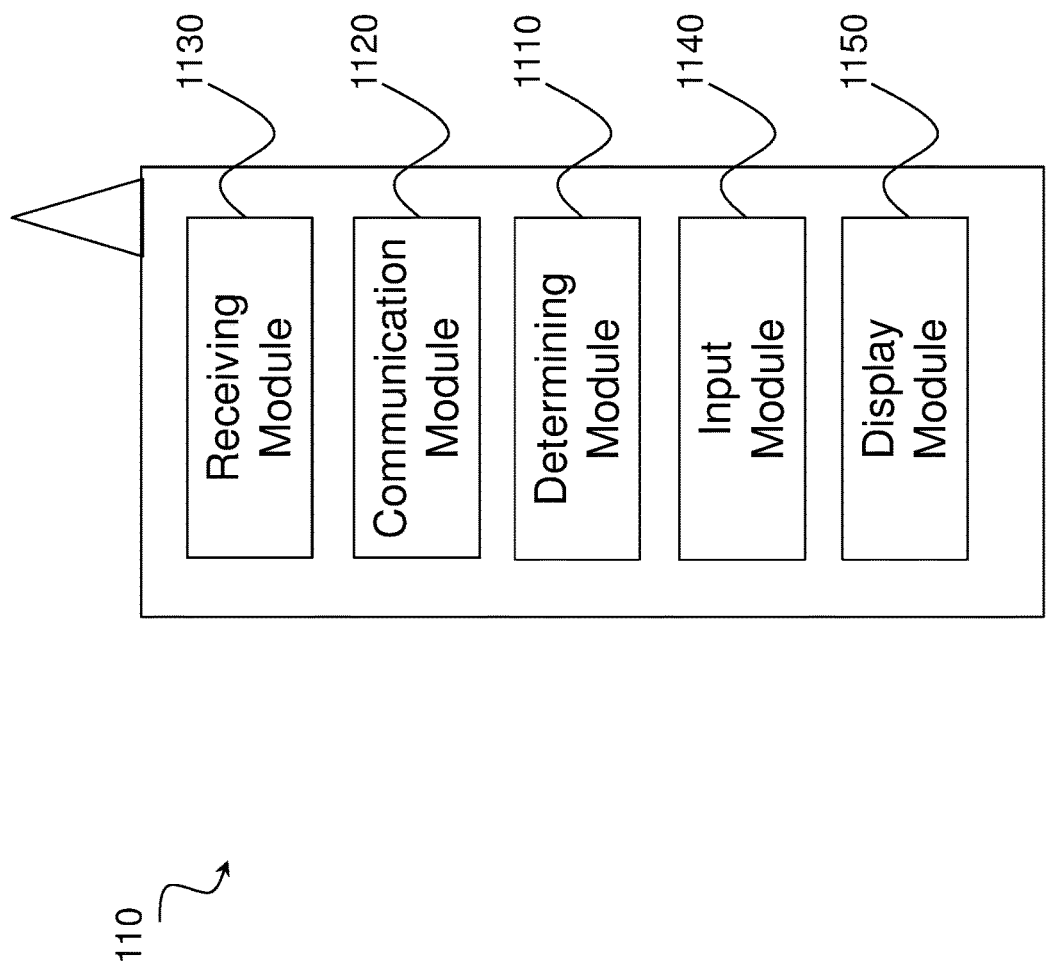
FIG. 11 is a block schematic of an exemplary wireless device, in accordance with certain embodiments.

FIG. 11 is a schematic block diagram of an exemplary wireless device, in accordance with certain embodiments. Wireless device 110 may include one or more modules. For example, wireless device 110 may include a determining module 1110, a communication module 1120, a receiving module 1130, an input module 1140, a display module 1150, and any other suitable modules. In some embodiments, one or more of determining module 1110, communication module 1120, receiving module 1130, input module 1140, display module 1150, or any other suitable module may be implemented using one or more processors, such as processing circuitry 820 described above in relation to FIG. 8. In certain embodiments, the functions of two or more of the various modules may be combined into a single module. Wireless device 110 may perform the methods for starting a timer described above in relation to FIGS. 1-7.

Determining module 1110 may perform the processing functions of wireless device 110. For example, determining module 1110 may, in response to receiving the grant, start a timer associated with dynamically-delayed scheduling, wherein at least one of a start time of the timer and a duration of the timer is configured such that the UE is active when an ACK of the one or more dynamically-delayed transmissions is expected to be received by the UE. As another example, determining module 1110 may start the timer when the UE performs one of the one or more dynamically-delayed transmissions scheduled by the received grant. As still another example, determining module 1110 may start the timer at a predefined time prior to performing one of the one or more dynamically-delayed transmissions scheduled by the received grant. As yet another example, determining module 1110 may start the timer when the grant is received. As another example, determining module 1110 may start the timer based on the first part of the grant. As another example, determining module 1110 may start the timer based on the second part of the grant. As another example, determining module 1110 may determine, based on one or more criteria, whether the timer associated with dynamically-delayed scheduling should be used.

Determining module 1110 may include or be included in one or more processors, such as processing circuitry 820 described above in relation to FIG. 8. Determining module 1110 may include analog and/or digital circuitry configured to perform any of the functions of determining module 1110 and/or processing circuitry 820 described above. The functions of determining module 1110 described above may, in certain embodiments, be performed in one or more distinct modules.

Communication module 1120 may perform the transmission functions of wireless device 110. For example, communication module 1120 may perform at least one of the scheduled one or more dynamically-delayed transmissions. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110. In certain embodiments, the functions of communication module 1120 described above may be performed in one or more distinct modules.

Receiving module 1130 may perform the receiving functions of wireless device 110. For example, receiving module 1130 may receive a grant, the grant scheduling one or more dynamically-delayed transmissions for the UE. As another example, determining module 1130 may receive a first part of the grant at a first time, the first part of the grant comprising information about a modulation and coding scheme for the one or more dynamically-delayed transmissions scheduled for the UE, and receive a second part of the grant at a second time, the second part of the grant indicating when the UE should perform the one or more dynamically-delayed transmissions. As still another example, receiving module 1130 may receive an ACK for the at least one performed dynamically-delayed transmission before the timer associated with dynamically-delayed scheduling expires.

Receiving module 1130 may include a receiver and/or a transceiver. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110. The functions of receiving module 1130 described above may, in certain embodiments, be performed in one or more distinct modules.

Input module 1140 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1110. The functions of input module 1140 described above may, in certain embodiments, be performed in one or more distinct modules.

Display module 1150 may present signals on a display of wireless device 110. Display module 1150 may include the display and/or any appropriate circuitry and hardware configured to present signals on the display. Display module 1150 may receive signals to present on the display from determining module 1110. The functions of display module 1150 described above may, in certain embodiments, be performed in one or more distinct modules.

Determining module 1110, communication module 1120, receiving module 1130, input module 1140, and display module 1150 may include any suitable configuration of hardware and/or software. Wireless device 110 may include additional modules beyond those shown in FIG. 11 that may be responsible for providing any suitable functionality, including any of the functionality described above and/or any additional functionality (including any functionality necessary to support the various solutions described herein).

Figure 12:
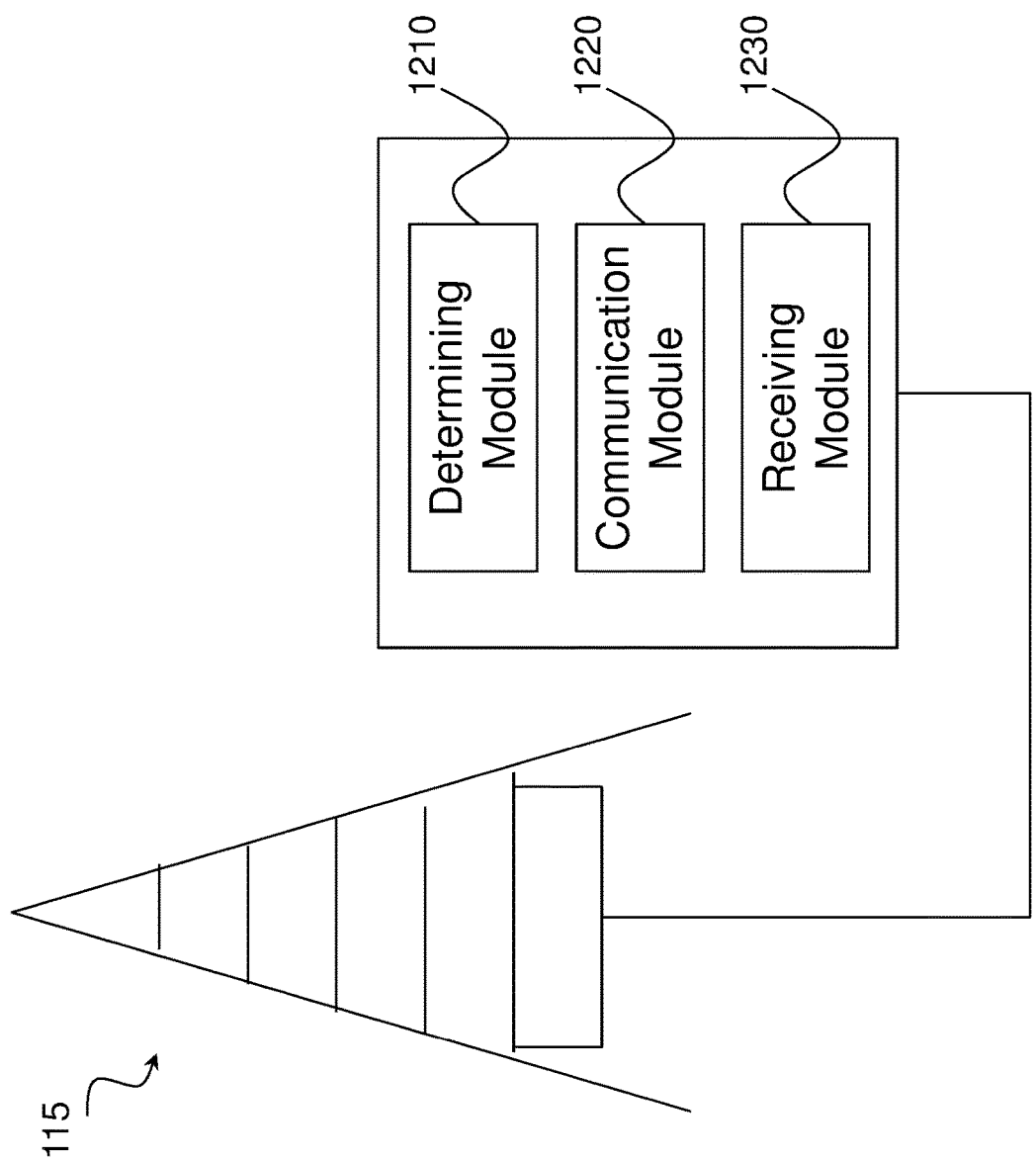
FIG. 12 is a block schematic of an exemplary network node, in accordance with certain embodiments.

FIG. 12 is a schematic block diagram of an exemplary network node 115, in accordance with certain embodiments. Network node 115 may include one or more modules. For example, network node 115 may include determining module 1210, communication module 1220, receiving module 1230, and any other suitable modules. In some embodiments, one or more of determining module 1210, communication module 1220, receiving module 1230, or any other suitable module may be implemented using one or more processors, such as processing circuitry 920 described above in relation to FIG. 9. In certain embodiments, the functions of two or more of the various modules may be combined into a single module. Network node 115 may perform the methods for starting a timer described above with respect to FIGS. 1-7.

Determining module 1210 may perform the processing functions of network node 115. As an example, determining module 1210 may configure a UE to start a timer associated with dynamically-delayed scheduling based on the UE receiving a grant scheduling one or more dynamically-delayed transmissions for the UE, wherein at least one of a start time of the timer and a duration of the timer is configured such that the UE is active when an ACK of the one or more dynamically-delayed transmissions is expected to be received by the UE. As another example, determining module 1210 may configure the UE to start the timer associated with dynamically-delayed scheduling when the UE performs one of the one or more dynamically-delayed transmissions scheduled by the sent grant. As still another example, determining module 1210 may configure the UE to start the timer associated with dynamically-delayed scheduling at a predefined time prior to performing one of the one or more dynamically-delayed transmissions scheduled by the sent grant. As yet another example, determining module 1210 may configure the UE to start the timer associated with dynamically-delayed scheduling when the UE receives the grant. As another example, determining module 1210 may configure the UE to start the timer associated with dynamically-delayed scheduling based on the first part of the grant. As another example, determining module 1210 may configure the UE to start the timer associated with dynamically-delayed scheduling based on the second part of the grant. As another example, determining module 1210 may determine, based on one or more criteria, whether the UE should be configured to use the timer associated with dynamically-delayed scheduling.

Determining module 1210 may include or be included in one or more processors, such as processing circuitry 920 described above in relation to FIG. 9. Determining module 1210 may include analog and/or digital circuitry configured to perform any of the functions of determining module 1210 and/or processing circuitry 920 described above. The functions of determining module 1210 may, in certain embodiments, be performed in one or more distinct modules.

Communication module 1220 may perform the transmission functions of network node 115. As one example, communication module 1220 may send the grant to the UE. As another example, determining module 1220 may send a first part of the grant at a first time, the first part of the grant comprising information about a modulation and coding scheme for the one or more dynamically-delayed transmissions scheduled for the UE, and send a second part of the grant at a second time, the second part of the grant indicating when the UE should perform the one or more dynamically-delayed transmissions. As still another example, communication module 1220 may send an ACK for the received at least one of the scheduled one or more dynamically-delayed transmissions.

Communication module 1220 may transmit messages to one or more of wireless devices 110. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210 or any other module. The functions of communication module 1220 may, in certain embodiments, be performed in one or more distinct modules.

Receiving module 1230 may perform the receiving functions of network node 115. As one example, receiving module 1230 may receive at least one of the scheduled one or more dynamically-delayed transmissions. Receiving module 1230 may receive any suitable information from a wireless device. Receiving module 1230 may include a receiver and/or a transceiver, such as transceiver 910 described above in relation to FIG. 9. Receiving module 1230 may include circuitry configured to wirelessly receive messages and/or signals. In particular embodiments, receiving module 1230 may communicate received messages and/or signals to determining module 1210 or any other suitable module. The functions of receiving module 1230 may, in certain embodiments, be performed in one or more distinct modules.

Determining module 1210, communication module 1220, and receiving module 1230 may include any suitable configuration of hardware and/or software. Network node 115 may include additional modules beyond those shown in FIG. 12 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3 GPP 3$^{rd}$ Generation Partnership Project
ACK Acknowledgement
AP Access Point
BS Base Station
BSC Base Station Controller
BTS Base Transceiver Station
CPE Customer Premises Equipment
D2D Device-to-device
DAS Distributed Antenna System
DL Downlink
DRX Discontinuous Reception
eNB evolved Node B
FDD Frequency Division Duplex
LAA License Assisted Access
LAN Local Area Network
LEE Laptop Embedded Equipment LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation level and coding scheme
MS Millisecond
MSR Multi-standard Radio
NAS Non-Access Stratum
NB-IoT Narrowband Internet-of-Things
NR New Radio
OFDM Orthogonal Frequency Division Multiplexing
PDCCH Physical Downlink Control Channel
PDSCH Physical Downlink Shared Channel
PSCCH Physical Sidelink Control Channel
PSSCH Physical Sidelink Shared Channel
PSTN Public Switched Telephone Network
RAT Radio Access Technology
RNC Radio Network Controller
RRC Radio Resource Control
RRH Remote Radio Head
RRU Remote Radio Unit
RTT Round-Trip Time
SA Scheduling Assignment
SCI Sidelink Control Information
TCP Transport Control Protocol
TDD Time Division Duplex
TM Transmission Mode
TS Technical Specification
TTI Transmission Time Interval
UE User Equipment
UL Uplink
WAN Wide Area Network

The invention claimed is:

1. A method in a user equipment, comprising:
receiving a grant, the grant scheduling one or more dynamically-delayed transmissions for the user equipment, wherein the one or more dynamically-delayed transmissions comprises one or more transmissions scheduled using dynamically-delayed scheduling; and
in response to receiving the grant, starting an inactivity timer associated with dynamically-delayed scheduling, wherein:
the inactivity timer comprises a timer that indicates how long the user equipment remains active after receiving the grant; and
at least one of a start time of the inactivity timer and a duration of the inactivity timer is configured such that the user equipment is active when an acknowledgement of the one or more dynamically-delayed transmissions is expected to be received by the user equipment.

2. The method of claim 1, comprising:
determining, based on one or more criteria, whether the inactivity timer associated with dynamically-delayed scheduling should be used,
wherein the one or more criteria comprise one or more of:
network signaling;
a type of cell on which the user equipment is scheduled;
a type of scheduling used; and
a type of grant used.

3. The method of claim 1, wherein starting the inactivity timer associated with dynamically-delayed scheduling comprises starting the inactivity timer when the user equipment performs one of the one or more dynamically-delayed transmissions scheduled by the received grant.

4. The method of claim 1, wherein starting the inactivity timer associated with dynamically-delayed scheduling comprises starting the inactivity timer at a predefined time prior to performing one of the one or more dynamically-delayed transmissions scheduled by the received grant.

5. The method of claim 1, wherein:
starting the inactivity timer associated with dynamically-delayed scheduling comprises starting the inactivity timer when the grant is received;
the duration of the inactivity timer associated with dynamically-delayed scheduling is extended such that the user equipment is active when an acknowledgement of the one or more dynamically-delayed transmissions is expected to be received; and
the duration of the inactivity timer associated with dynamically-delayed scheduling is longer than another inactivity timer associated with grants that do not schedule dynamically-delayed transmissions.

6. The method of claim 1, wherein receiving the grant comprises:
receiving a first part of the grant at a first time, the first part of the grant comprising information about a modulation and coding scheme for the one or more dynamically-delayed transmissions scheduled for the user equipment; and
receiving a second part of the grant at a second time, the second part of the grant indicating when the user equipment should perform the one or more dynamically-delayed transmissions; and
wherein an amount of delay associated with the one or more dynamically-delayed transmissions is indicated in at least one of the first part of the grant and the second part of the grant.

7. The method of claim 6, wherein starting the inactivity timer associated with dynamically-delayed scheduling comprises starting the inactivity timer based on the first part of the grant.

8. The method of claim 6, wherein starting the inactivity timer associated with dynamically-delayed scheduling comprises starting the inactivity timer based on the second part of the grant.

9. The method of claim 1, comprising:
performing at least one of the scheduled one or more dynamically-delayed transmissions; and
receiving an acknowledgement for the at least one performed dynamically-delayed transmission before the inactivity timer associated with dynamically-delayed scheduling expires.

10. A method in a network node, comprising:
configuring a user equipment to start an inactivity timer associated with dynamically-delayed scheduling based on the user equipment receiving a grant scheduling one or more dynamically-delayed transmissions for the user equipment, wherein:
the inactivity timer comprises a timer that indicates how long the user equipment remains active after receiving the grant;
at least one of a start time of the inactivity timer and a duration of the inactivity timer is configured such that the user equipment is active when an acknowledgement of the one or more dynamically-delayed transmissions is expected to be received by the user equipment;
the one or more dynamically-delayed transmissions comprises one or more transmissions scheduled using dynamically-delayed scheduling; and
sending the grant to the user equipment.

11. The method of claim 10, comprising determining, based on one or more criteria, whether the user equipment should be configured to use the inactivity timer associated with dynamically-delayed scheduling,
wherein the one or more criteria comprise one or more of:
a type of cell on which the user equipment is scheduled;
a type of scheduling used; and
a type of grant used.

12. The method of claim 10, wherein configuring the user equipment to start the inactivity timer associated with dynamically-delayed scheduling based on the user equipment receiving a grant comprises:
configuring the user equipment to start the inactivity timer associated with dynamically-delayed scheduling when the user equipment performs one of the one or more dynamically-delayed transmissions scheduled by the sent grant.

13. The method of claim 10, wherein configuring the user equipment to start the inactivity timer associated with dynamically-delayed scheduling based on the user equipment receiving a grant comprises:
configuring the user equipment to start the inactivity timer associated with dynamically-delayed scheduling at a predefined time prior to performing one of the one or more dynamically-delayed transmissions scheduled by the sent grant.

14. The method of claim 10, wherein configuring the user equipment to start the inactivity timer associated with dynamically-delayed scheduling based on the user equipment receiving a grant comprises:
configuring the user equipment to start the inactivity timer associated with dynamically-delayed scheduling when the user equipment receives the grant; and wherein:
the duration of the inactivity timer associated with dynamically-delayed scheduling is extended such that the user equipment is active when an acknowledgement of the one or more dynamically-delayed transmissions is expected to be received; and
the duration of the inactivity timer associated with dynamically-delayed scheduling is longer than another timer associated with grants that do not schedule dynamically-delayed transmissions.

15. The method of claim 10, wherein sending the grant comprises:
sending a first part of the grant at a first time, the first part of the grant comprising information about a modulation and coding scheme for the one or more dynamically-delayed transmissions scheduled for the user equipment; and
sending a second part of the grant at a second time, the second part of the grant indicating when the user equipment should perform the one or more dynamically-delayed transmissions; and
wherein an amount of delay associated with the one or more dynamically-delayed transmissions is indicated in at least one of the first part of the grant and the second part of the grant.

16. The method of claim 15, wherein configuring the user equipment to start the inactivity timer associated with dynamically-delayed scheduling based on the user equipment receiving a grant comprises:
configuring the user equipment to start the inactivity timer associated with dynamically-delayed scheduling based on the first part of the grant.

17. The method of claim 15, wherein configuring the user equipment to start the inactivity timer associated with dynamically-delayed scheduling based on the user equipment receiving a grant comprises:
configuring the user equipment to start the inactivity timer associated with dynamically-delayed scheduling based on the second part of the grant.

18. The method of claim 10, wherein the one or more dynamically-delayed transmissions comprise a plurality of uplink transmissions scheduled in a plurality of subframes.

19. A user equipment, comprising:
processing circuitry, the processing circuitry configured to:
receive a grant, the grant scheduling one or more dynamically-delayed transmissions for the user equipment, wherein the one or more dynamically-delayed transmissions comprises one or more transmissions scheduled using dynamically-delayed scheduling; and
in response to receiving the grant, start an inactivity timer associated with dynamically-delayed scheduling, wherein:
the inactivity timer comprises a timer that indicates how long the user equipment remains active after receiving the grant; and
at least one of a start time of the inactivity timer and a duration of the inactivity timer is configured such that the user equipment is active when an acknowledgement of the one or more dynamically-delayed transmissions is expected to be received by the user equipment.

20. The user equipment of claim 19, wherein the processing circuitry is configured to:
determine, based on one or more criteria, whether the inactivity timer associated with dynamically-delayed scheduling should be used.

21. The user equipment of claim 20, wherein the one or more criteria comprise one or more of:
network signaling;
a type of cell on which the user equipment is scheduled;
a type of scheduling used; and
a type of grant used.

22. The user equipment of claim 19, wherein the processing circuitry configured to start the inactivity timer associated with dynamically-delayed scheduling comprises processing circuitry configured to start the inactivity timer when the user equipment performs one of the one or more dynamically-delayed transmissions scheduled by the received grant.

23. The user equipment of claim 19, wherein the processing circuitry configured to start the inactivity timer associated with dynamically-delayed scheduling comprises processing circuitry configured to start the inactivity timer at a predefined time prior to performing one of the one or more dynamically-delayed transmissions scheduled by the received grant.

24. The user equipment of claim 19, wherein:
the processing circuitry configured to start the inactivity timer associated with dynamically-delayed scheduling comprises processing circuitry configured to start the inactivity timer when the grant is received;
the duration of the inactivity timer associated with dynamically-delayed scheduling is extended such that the user equipment is active when an acknowledgement of the one or more dynamically-delayed transmissions is expected to be received; and
the duration of the inactivity timer associated with dynamically-delayed scheduling is longer than another timer associated with grants that do not schedule dynamically-delayed transmissions.

25. The user equipment of claim 19, wherein:
the one or more dynamically-delayed transmissions comprise one or more uplink transmissions; and
the grant is an uplink grant for the one or more uplink transmissions.

26. The user equipment of claim 19, wherein:
the one or more dynamically-delayed transmissions comprise one or more sidelink transmissions; and
the grant is a sidelink grant for the one or more sidelink transmissions.

27. The user equipment of claim 19, wherein the processing circuitry configured to receive the grant comprises processing circuitry configured to:
receive a first part of the grant at a first time, the first part of the grant comprising information about a modulation and coding scheme for the one or more dynamically-delayed transmissions scheduled for the user equipment; and
receive a second part of the grant at a second time, the second part of the grant indicating when the user equipment should perform the one or more dynamically-delayed transmissions; and
wherein an amount of delay associated with the one or more dynamically-delayed transmissions is indicated in at least one of the first part of the grant and the second part of the grant.

28. The user equipment of claim 27, wherein the processing circuitry configured to start the inactivity timer associated with dynamically-delayed scheduling comprises processing circuitry configured to start the inactivity timer based on the first part of the grant.

29. The user equipment of claim 27, wherein the processing circuitry configured to start the inactivity timer associated with dynamically-delayed scheduling comprises processing circuitry configured to start the inactivity timer based on the second part of the grant.

30. The user equipment of claim 19, wherein the one or more dynamically-delayed transmissions comprise a plurality of uplink transmissions scheduled in a plurality of subframes.

31. The user equipment of claim 19, wherein the processing circuitry is configured to:
perform at least one of the scheduled one or more dynamically-delayed transmissions; and
receive an acknowledgement for the at least one performed dynamically-delayed transmission before the inactivity timer associated with dynamically-delayed scheduling expires.

32. A network node, comprising:
processing circuitry, the processing circuitry configured to:
configure a user equipment to start an inactivity timer associated with dynamically-delayed scheduling based on the user equipment receiving a grant scheduling one or more dynamically-delayed transmissions for the user equipment, wherein:
the inactivity timer comprises a timer that indicates how long the user equipment remains active after receiving the grant;
at least one of a start time of the inactivity timer and a duration of the inactivity timer is configured such that the user equipment is active when an acknowledgement of the one or more dynamically-delayed transmissions is expected to be received by the user equipment;
the one or more dynamically-delayed transmissions comprises one or more transmissions scheduled using dynamically-delayed scheduling; and
send the grant to the user equipment.

33. The network node of claim 32, wherein the processing circuitry is configured to determine, based on one or more criteria, whether the user equipment should be configured to use the inactivity timer associated with dynamically-delayed scheduling.

34. The network node of claim 33, wherein the one or more criteria comprise one or more of:
a type of cell on which the user equipment is scheduled;
a type of scheduling used; and
a type of grant used.

35. The network node of claim 32, wherein the processing circuitry configured to configure the user equipment to start the inactivity timer associated with dynamically-delayed scheduling based on the user equipment receiving a grant comprises processing circuitry configured to:
configure the user equipment to start the inactivity timer associated with dynamically-delayed scheduling when the user equipment performs one of the one or more dynamically-delayed transmissions scheduled by the sent grant.

36. The network node of claim 32, wherein the processing circuitry configured to configure the user equipment to start the inactivity timer associated with dynamically-delayed scheduling based on the user equipment receiving a grant comprises processing circuitry configured to:
configure the user equipment to start the inactivity timer associated with dynamically-delayed scheduling at a predefined time prior to performing one of the one or more dynamically-delayed transmissions scheduled by the sent grant.

37. The network node of claim 32, wherein the processing circuitry configured to configure the user equipment to start the inactivity timer associated with dynamically-delayed scheduling based on the user equipment receiving a grant comprises processing circuitry configured to:
configure the user equipment to start the inactivity timer associated with dynamically-delayed scheduling when the user equipment receives the grant; and wherein:
the duration of the inactivity timer associated with dynamically-delayed scheduling is extended such that the user equipment is active when an acknowledgement of the one or more dynamically-delayed transmissions is expected to be received; and
the duration of the inactivity timer associated with dynamically-delayed scheduling is longer than another timer associated with grants that do not schedule dynamically-delayed transmissions.

38. The network node of claim 32, wherein:
the one or more dynamically-delayed transmissions comprise one or more uplink transmissions; and
the sent grant is an uplink grant for the one or more uplink transmissions.

39. The network node of claim 32, wherein:
the one or more dynamically-delayed transmissions comprise one or more sidelink transmissions; and
the sent grant is a sidelink grant for the one or more sidelink transmissions.

40. The network node of claim 32, wherein the processing circuitry configured to send the grant comprises processing circuitry configured to:
send a first part of the grant at a first time, the first part of the grant comprising information about a modulation and coding scheme for the one or more dynamically-delayed transmissions scheduled for the user equipment; and send a second part of the grant at a second time, the second part of the grant indicating when the user equipment should perform the one or more dynamically-delayed transmissions; and wherein an amount of delay associated with the one or more dynamically-delayed transmissions is indicated in at least one of the first part of the grant and the second part of the grant.

41. The network node of claim 40, wherein the processing circuitry configured to configure the user equipment to start the inactivity timer associated with dynamically-delayed scheduling based on the user equipment receiving a grant comprises processing circuitry configured to:

configure the user equipment to start the inactivity timer associated with dynamically-delayed scheduling based on the first part of the grant.

42. The network node of claim 40, wherein the processing circuitry configured to configure the user equipment to start the inactivity timer associated with dynamically-delayed scheduling based on the user equipment receiving a grant comprises processing circuitry configured to:

configure the user equipment to start the inactivity timer associated with dynamically-delayed scheduling based on the second part of the grant.

43. The network node of claim 32, wherein the one or more dynamically-delayed transmissions comprise a plurality of uplink transmissions scheduled in a plurality of subframes.

* * * * *